(12) United States Patent
Matsubara et al.

(10) Patent No.: US 7,684,306 B2
(45) Date of Patent: Mar. 23, 2010

(54) OPTICAL PICKUP APPARATUS

(75) Inventors: Kazunori Matsubara, Shiki-gun (JP);
Shinzoh Murakami, Kitakatsuragi-gun (JP); Tetsuo Ueyama, Nara (JP); Kazuhiro Tsuchida, Higashihiroshima (JP); Yukio Watanabe, Uji (JP); Osamu Miyazaki, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 782 days.

(21) Appl. No.: 11/496,814

(22) Filed: Jul. 31, 2006

(65) Prior Publication Data

US 2007/0025228 A1  Feb. 1, 2007

(30) Foreign Application Priority Data

Jul. 29, 2005  (JP)  ............................. 2005-221747
Nov. 10, 2005  (JP)  ............................. 2005-326504
Jun. 20, 2006  (JP)  ............................. 2006-170726
Jul. 25, 2006  (JP)  ............................. 2006-202513

(51) Int. Cl.
    *G11B 7/00*  (2006.01)

(52) U.S. Cl. ............................. 369/112.12; 369/112.07; 369/112.06; 369/112.15; 369/112.1; 369/112.11; 369/112.01

(58) Field of Classification Search ............... 369/112.1, 369/112.01, 112.11, 112.12, 112.06, 112.07
See application file for complete search history.

(56) References Cited

U.S. PATENT DOCUMENTS

2004/0184383 A1  9/2004  Nakayama et al.
2005/0199778 A1*  9/2005  Kadowaki et al. ........ 250/201.5
2006/0262695 A1*  11/2006  Tsuchida et al. .............. 369/94

FOREIGN PATENT DOCUMENTS

| JP | 2004-288227 A | 10/2004 |
| JP | 2004-303296 A | 10/2004 |
| WO | WO-2004/088645 A1 | 10/2004 |
| WO | WO 2004088645 A1 * | 10/2004 |

* cited by examiner

*Primary Examiner*—Wayne R Young
*Assistant Examiner*—LaTanya Bibbins
(74) *Attorney, Agent, or Firm*—Morrison & Foerster LLP

(57) ABSTRACT

There is provided an optical pickup apparatus that can obtain a stable servo signal by reducing stray light generated by diffraction in a recording layer other than a recording layer on which light is condensed. A hologram element provided in an optical pickup apparatus for recording information onto a recording medium and/or reproducing information on the recording medium by use of light includes fourth and fifth divisions where at least first-order diffracted light among diffracted light beams obtained by reflection and diffraction on a recording layer other than a light-condensed recording layer on which light is condensed by an objective lens so as not to be directed toward first and second light-receiving elements for detecting focus position information and third to eighth light-receiving elements for detecting track position information.

19 Claims, 16 Drawing Sheets

OPTICAL PICKUP APPARATUS

REFERENCE TO RELATED APPLICATIONS

This application claims priority under 35 USC 119 from Japanese Patent Applications Nos. 2005-221747, 2005-326504, 2006-170726 and 2006-202513, filed Jul. 29, 2005, Nov. 10, 2005, Jun. 20, 2006, and Jul. 25, 2006, respectively, the entire contents of which are hereby incorporated by reference.

BACKGROUND OF THE INVENTION

1. Field of the Invention The present invention relates to an optical pickup apparatus for executing at least one of processes of recording and reproducing information onto/on a recording medium by irradiating the recording medium with light.

2. Description of the Related Art

Recording mediums usable in an information recording/reproducing apparatus include a compact disk (abbreviated as CD), a digital versatile disc (abbreviated as DVD), and a Blu-ray disc (registered trademark). A recording/reproducing process of the CD is executed using light in an infrared wavelength region around 780 nm. A recording/reproducing process of the DVD is executed using light of which wavelength is shorter than that of the light used for the recording/reproducing process of the CD; to be specific, red light in a wavelength region around 650 nm. A recording/reproducing process of the Blu-ray disc is executed using blue-violet light in a wavelength region around 405 nm. As a widely-used light-assisted recording medium(hereinafter may be referred to as "an optical recording medium"), a plurality of recording layers are formed in one recording medium into a multilayer structure, resulting in increase in recording capacity.

Regarding reproduction and recording of information on/onto the optical recording medium, a pit indented in a recording layer of an optical recording medium for only reproduction and a track consisting of a land and a groove formed in a recording layer of an optical recording medium for recoding are irradiated with laser light, and reflected light of the laser light is detected by a light-receiving element to execute reproduction or recording of the information and moreover, a servo signal is detected to conduct a servo control.

However, in the optical recording medium having a multi-layer structure is generated not only light reflected-by a light-condensed recording layer, but also light reflected by a recording layer other than the light-condensed recording layer. The light reflected by a recording layer other than the light-condensed recording layer is referred to as stray light. Such light, as well as the light reflected by the light-condensed recording layer, enters a hologram element serving as light-splitting unit for guiding the reflected light to the light-receiving element, where the light is then diffracted to further enter the light-receiving element where the stray light functions as noise, resulting in superposition of the noise onto the servo control signal. Consequently, there arises a problem that the servo control cannot be stably conducted.

An optical pickup apparatus has been proposed that solves the problem caused by the stray light generated at the time of recording and reproducing information onto/on an optical recording medium having a multilayer structure (for example, see Japanese Unexamined Patent Publication JP-A 2004-303296 and Japanese Unexamined Patent Publication JP-A 2004-288227).

FIG. 15 is a schematic view showing a configuration of a related-art optical pickup apparatus 1. FIG. 16 is a schematic view showing configurations of a hologram element 4 and light-detecting unit 7 provided in the optical pickup apparatus 1 shown in FIG. 15. In the following descriptions regarding the optical pickup apparatus 1, a tangential direction to a track formed on a recording medium 8 is defined as an X-axis direction, and a radial direction of the recording medium 8 is defined as a Y-axis direction. Note that the radial direction of the recording medium 8 represents a direction along one radial line connecting a point at an intersection between an optical axis of light emitted by the optical pickup apparatus 1 and a recording surface of the recording medium 8, with a center of the recording medium 8. Further, the radial direction is perpendicular to the tangential direction in the recording surface of the recording medium 8. Further, a Z-axis direction represents a direction which is perpendicular to the X-axis direction and Y-axis direction and which is parallel to an optical axis 14 of light emitted by a light source 2.

The optical pickup apparatus 1 comprises a light source 2 for emitting light, a diffraction grating 3, a hologram element 4, a collimation lens 5, an objective lens 6 serving as light-condensing unit, and the light-detecting unit 7 having a plurality of light-receiving elements. The optical pickup apparatus executes at least one of processes of recording information onto the recording medium 8 and reproducing information recorded on the recording medium 8.

For the light source 2, a semiconductor laser element is used, for example. Light emitted by the light source 2 is split by the diffraction grating 3 into at least three beams; namely, a main beam 11, a first sub beam 12, and a second sub beam 13. The diffraction grating 3 has a structure in which concavities and convexities are regularly formed to diffract the emitted light so as to generate a plurality of beams. The main beam 11 is a main luminous flux for taking out information recorded on the recording medium 8. The sub beams 12 and 13 are sub luminous fluxes which are used for performing control on a light-condensing position of the main beam 11. The light split by the diffraction grating 3 proceeds through the hologram element 4 and then proceeds through the collimation lens 5 by which the light is made to substantially parallel light, thereafter being guided to the objective lens 6.

The objective lens 6 condenses the light emitted by the light source 2 onto a recording layer which contains information recorded on the recording medium 8. The objective lens 6 is supported by an actuator (not shown) so as to be displaceable in both of directions which are parallel to and perpendicular to the optical axis 14 of the emitted light. Displacement of the objective lens 6 in the direction which are parallel to and perpendicular to the optical axis 14 of the emitted light, causes change of the light-condensing position of the emitted light onto the recording medium 8.

The main beam 11 and the first and second sub beams 12 and 13 are condensed by the objective lens 6 onto the recording medium 8. The main beam 11 and first and second sub beams 12 and 13 which have been reflected by the recording medium 8 proceed through the objective lens 6 and then proceed through the collimation lens 5, thereafter being guided to the hologram element 4.

The hologram element 4 serving as light-splitting unit is disposed between the light-detecting unit 7 and the objective lens 6. In the hologram element 4 are formed a hologram pattern having a plurality of divisions for splitting the light reflected by the recording medium 8 into a plurality of light beams.

The hologram pattern of the hologram element 4 provided in the optical pickup apparatus 1 is formed so that an outline of the hologram pattern when seen from one side in the Z-axis direction has a substantially-circular shape. The hologram pattern of the hologram element 4 is firstly divided into a first division 21 and a remaining part by a first dividing line 16 which is substantially parallel to the Y-axis direction that is a radial direction of the recording medium 8 placed in an information recording/reproducing apparatus so as to be in a recording or reproducing state. The first dividing line 16 contains in a center part thereof a semicircular curved section 16a. The remaining part is further divided into a second division 22 and a third division 23 by a second dividing line 17 which is parallel to the X-axis line that is a tangential direction to a track formed on the recording medium 8.

The first division 21 is formed so as to have a semicircular protruded region 24 which protrudes toward the second and third divisions 22 and 23 beyond a virtual dividing line 18 connecting both ends of the first dividing line 16 in the semicircular curved section 16a of the first dividing line 16. Accordingly, the second and third divisions 22 and 23 are each formed into a shape of substantial quarter of annulus ring.

The light-detecting unit 7 has eight light-receiving elements 7a, 7b, 7c, 7d, 7e, 7f, 7g, and 7h. Each of the light-receiving elements 7a to 7h has a substantially-rectangular shape when seen from one side in the Z-axis direction, and is disposed so that a longitudinal direction of the substantially-rectangular shape-is parallel to the Y-axis direction. In the light-detecting unit 7, the light-receiving elements 7e, 7c, 7f, 7a, 7b, 7g, 7d, and 7h are disposed in the X-axis direction in this order. Each of the light-receiving elements 7a to 7d receives light of the main beam 11 reflected by the recording medium 8. Each of the light-receiving elements 7e to 7h receives light of the sub beams 12 and 13 reflected by the recording medium 8.

When the light of the main beam 11 reflected by the recording medium 8 enters the hologram element 4, light diffracted by the first division 21 falls onto a boundary between the light-receiving element 7a and the light-receiving element 7b, and light diffracted by the second division 22 falls onto the light-receiving element 7d, and light diffracted by the third division 23 falls onto the light-receiving element 7c. When the light of the sub beams 12 and 13 reflected by the recording medium 8 enters the hologram element 4, light diffracted by the first division 21 does not fall onto the boundary between the light-receiving element 7a and the light-receiving element 7b, but falls onto positions on both sides of the light-receiving element 7a and the light-receiving 7b, where no light-receiving elements exist, and light diffracted by the second division 22 falls onto the light-receiving element 7g and the light-receiving element 7h, and light diffracted by the third division 23 falls onto the light-receiving element 7e and the light-receiving element 7f.

A focus error signal (abbreviated as FES) acting as a servo control signal for focusing is generated from a signal detected by the light-receiving element 7a and light-receiving element 7b. A tracking error signal (abbreviated as TES) acting as a servo control signal for tracking is generated from a signal detected by the light-receiving elements 7c to 7h.

The generation of the FES and TES as mentioned above represents generation of signals through the light reflected by a light-condensed recording layer on which light is being condensed by the objective lens 6. In a case where the recording medium 8 has a multilayer structure, there is also generated light reflected by a recording layer other than the light-condensed recording layer.

FIG. 17 is a view of assistance in explaining outlines of processes related to transmission and reflection of light on the recording medium 8 having two recording layers. In FIG. 17, in order to avoid complications so as to facilitate understanding, only transmission and reflection of the main beam 11 are shown and further, FIG. 17 is shown on the assumption that a refractive index of the recording layer is identical to that of air. In the recording medium 8 having two recording layers, a recording layer positioned close to the objective lens 6 is referred to as a first recording layer 25a while a recording layer positioned away from the objective lens 6 is referred to as a second recording layer 25b. A distance between the first recording layer 25a and the second recording layer 25b is referred to as td (hereinafter may be referred to "an interlayer distance").

The main beam 11 exiting from the objective lens 6 is reflected by the first recording layer 25a which is a light-condensed recording layer. The resultant direct reflection; namely zero-order diffracted light 11a proceeds through the objective lens 6 and collimation lens 5 again and is further diffracted by the hologram element 4 to fall onto each of the light-receiving elements 7a to 7d of the light-detecting unit 7. This is the same as in the above-described case.

However, the main beam 11 contains a component which is transmitted by the first recording layer 25a. Such remaining light transmitted by the first recording layer 25a enters the second recording layer 25b, a track on which reflects the light to generate zero-order diffracted light 11b and + first-order diffracted light 11c. In the following description, a symbol "+" of the + first-order diffracted light 11c will be omitted.

The zero-order diffracted light 11b generated by the second recording layer 25b is reflected so as to be directed toward the objective lens 6 as if a light-condensed point is positioned away from the second recording layer 25b by the interlayer distance td. The zero-order diffracted light 11b is reflected so as to be directed toward the objective lens 6 at the same angle as an angle of incidence of main beam 11 entering the second recording layer 25b. The zero-order diffracted light 11b is transmitted by the first recording layer 25a and proceeds through the objective lens 6 and collimation lens 5 again to be more condensed than the light reflected by the first recording layer 25a, thereafter entering the hologram element 4.

FIG. 18 is a view of assistance in explaining a state where the light diffracted by the second recording layer 25b enters the hologram element 4 and the light-detecting unit 7. The zero-order diffracted light 11b diffracted by the second recording layer 25b enters the protruded region 24 of the first division 21 in the hologram element 4, and forms a zero-order diffracted light spot 26. In the hologram element 4 of the optical pickup apparatus 1, a diameter of the semicircular curved section 16a separating the protruded region 24 from the second and third divisions 22 and 23 is determined so that the resulting zero-order diffracted light-spot 26 does not extend to the second and third divisions 22 and 23 by which light for generating TES is diffracted.

The zero-order diffracted light 11b reflected by the second recording layer 25b is all made to enter the protruded region 24 as described above and by so doing, the zero-order diffracted light 11b is no longer diffracted toward the light-receiving elements 7c to 7h for generation of TES. Consequently, the zero-order diffracted light 11b is never received as stray light and it is therefore possible to obtain TES by light not including stray light generated through the reflection on the second recording layer 25b which is different from the first recording layer 25a serving as a light-condensed recording layer.

The zero-order diffracted light 11b incident on the protruded region 24 included in the first division 21 is diffracted by the first division 21 so as to fall onto the light-receiving elements 7a and 7b for generating FES as stray light. The fallen light on the light-receiving elements 7a and 7b forms an extremely blurred fallen spot 27, and an intensity distribution of light incident as stray light is spread out, resulting in a sufficiently small amount of signal with respect to the light reflected by the first recording layer 25a. Moreover, FES is obtained by a differential between the light-receiving element 7a and the light-receiving element 7b and therefore, in a case where the light enters both of the light-receiving elements 7a and 7b, the light on the light-receiving element 7a and the light on the light-receiving element 7b are cancelled out, thereby suppressing noise caused by those light.

As shown in FIG. 17, there exists not only the zero-order diffracted light 11b, but also higher-order diffracted light; namely, the first-order diffracted light 11c as light which is transmitted by the first recording layer 25a and then reflected and diffracted by the second recording layer 25b. In this context, the higher-order diffracted light indicates the first-order or higher-order diffracted light.

The first-order diffracted light 11c having a higher diffraction order than that of the zero-order diffracted light 11b, as shown in FIG. 18, enters the hologram element 4 so as to form thereon two light spots; namely a first light spot 28 and a second light spot 29 between which the zero-order diffracted light spot 26 lies and which are arranged in the Y-axis direction. The first-order diffracted light 11c is incident on the first dividing line 16 around which the first light spot 28 expands in the first division 21 and second division 22 on the hologram element 4 while the first-order diffracted light 11c is incident on the first dividing line 16 around which the second light spot 29 expands in the first division 21 and third division 23 on the hologram element 4. Since the first and second light spots 28 and 29 are formed respectively in the second division 22 and third division 23 where light for generating TES is diffracted, the light incident on each of the second and third divisions 22 and 23 is diffracted and then guided to the light-receiving elements 7c to 7h for detecting TES.

With the first-order diffracted light diffracted in the second division 22 are irradiated the light-receiving elements 7f, 7d, and 7h over which a widely expanded first fallen spots 30 is formed. With the first-order diffracted light diffracted in the third division 23 are irradiated the light-receiving elements 7e, 7c, and 7g over which a widely expanded second fallen spot 31 is formed. The light-receiving elements 7f, 7d, and 7h and the light-receiving elements 7e, 7c, and 7g are provided originally for the purpose of receiving the sub beams 12 and 13. Since light intensity of the sub beams 12 and 13 is low; that is, approximately one tenth of the light intensity of the main beam 11, a signal amplification level for a detected output through the light-receiving element for receiving the sub beams 12 and 13 is set to be larger than a signal amplification level for a detected output through the light-receiving element for receiving the main beam 11.

Consequently, detected signals from the first and second fallen spots 30 and 31 formed of light acting as stray light are also largely amplified, with the result that the stray light; namely, the first-order diffracted light 11c diffracted by the second recording layer 25b has a large impact on the light reflected by the first recording layer 25a, and the stray light generates unnecessary noise components and offset components. As a result, there arises a problem that track servo characteristics are deteriorated.

That is to say, the optical pickup apparatus 1 proposed in JP-A 2004-303296 has a problem that it is not possible to eliminate influences of the higher-order diffracted light on a recording layer other than the light-condensed recording layer, although the optical pickup apparatus 1 can eliminate influences of the zero-order diffracted light that is light simply reflected by a recording layer other than the light-condensed recording layer.

SUMMARY OF THE INVENTION

An object of the invention is to provide an optical pickup apparatus that can obtain a stable servo signal by reducing stray light generated by diffraction in a recording layer other than a recording layer on which light is condensed.

The invention provides an optical pickup apparatus for recording information onto a recording medium having a plurality of recording layers for recording information and/or reproducing information on the recording medium by irradiating the recording medium with light the recording medium, the optical pickup apparatus comprising:

a light source for emitting light;

light-condensing unit for condensing light emitted by the light source onto one recording layer of the recording medium, the light-condensing unit changing a light-condensed position of the emitted light with respect to the recording medium by displacement of the emitted light in a direction perpendicular to an optical axis of the emitted light;

light-detecting unit having a plurality of light-receiving elements for receiving light reflected by the recording medium; and light-splitting unit provided between the light-detecting unit and the light-condensing unit, the light-splitting unit having a plurality of-divisions for diffracting the light reflected by the recording medium toward the plurality of light-receiving elements, wherein the light-splitting unit has a division where at least first-order diffracted light among diffracted light beams obtained by reflection and diffraction on recording layers other than the one recording layer on which light is condensed by the light-condensing unit is diffracted so as not to be directed toward a light-receiving element for detecting track position information indicating information of emitted light condensing position to the recording medium in the direction perpendicular to the optical axis of the emitted light.

According to the invention, light-splitting unit comprises a division where at least first-order diffracted light among diffracted light beams which are obtained by reflection and diffraction on recording layers other than the one recording layer on which light is condensed by the light-condensing unit is diffracted((hereinafter may be referred to as "a light-condensed recording layer"), so as not to be directed toward a light-receiving element for detecting track position information. By so doing, in a recording medium having a plurality of recording layers, at least the first-order diffracted light among light beams diffracted on recording layers other than the light-condensed recording layer is made so as not to fall on a tracking error signal (hereinafter referred to as "a TES")-generating light-receiving element so that the TES can be prevented from containing stray light noise. This makes it possible to stably generate the TES.

Further, in the invention, it is preferable that the light-splitting unit further has a division where zero-order diffracted light among the diffracted light beams which are obtained by reflection and diffraction on recording layers other than the one recording layer is diffracted so as not to be directed toward the light-receiving element for detecting the track position information.

According to the invention, the light-splitting unit provided in the optical pickup apparatus has a division where zero-order diffracted light among the diffracted light beams which are obtained by reflection and diffraction on recording layers other than the one recording layer is diffracted so as not to be directed toward the light-receiving element for detecting the track position information. By so doing, in the recording medium having the plurality of recording layers, at least the zero-order diffracted light among light beams diffracted on recording layers other than the light-condensed recording layer is made so as not to fall on the TES-generating light-receiving element, so that the TES can be prevented from containing the stray light noise. This makes it possible to stably generate the TES.

Further, in the invention, it is preferable that the light-splitting unit further has a division being capable of encompassing a light spot independently of its position which light spot is formed as a result of incidence of zero-order diffracted light among the diffracted light beams obtained by reflection and diffraction on recording layers other than the recording layer on which light is condensed by the light-condensing unit, and whose position fluctuates in the direction perpendicular to the optical axis of the emitted light in accordance with displacement of the light-condensing unit in the direction perpendicular to the optical axis of the emitted light.

According to the invention, the light-splitting unit has a division being capable of encompassing a light spot independently of its position which light spot is formed as a result of incidence of zero-order diffracted light among the diffracted light beams obtained by reflection and diffraction on recording layers other than the recording layer, and whose position fluctuates in the direction perpendicular to the optical axis of the emitted light in accordance with displacement of the light-condensing unit in the direction perpendicular to the optical axis of the emitted light. In this manner, even in a case where a center of rotation of the recording medium and a center of track of the recording medium are decentered from each other so that an amount of displacement of an objective lens in a radial direction of the recording medium is large, both of the zero-order diffracted light and first-order diffracted light. diffracted by a recording layer other than the light-condensed recording layer are made so as not to fall on the TES-generating light-receiving element, so that the TES can be prevented from containing the stray light noise. This makes it possible to stably generate the TES.

Further, in the invention, it is preferable that the light-splitting unit further has a division where at least first-order diffracted light among the diffracted light beams enters that are obtained by reflection and diffraction on recording layers other than the recording layer on which light is condensed by the light-condensing unit.

According to the invention, the light-splitting unit further has a division where at least first-order diffracted light among the diffracted light beams enters that are obtained by reflection and diffraction on recording layers other than the recording layer , with the result that both of the zero-order diffracted light and, first-order diffracted light diffracted by a recording layer other than the light-condensed recording layer are made so as not to fall on the TES-generating light-receiving element, so that the TES can be prevented from containing the stray light noise. This makes it possible to stably generate the TES.

Further, in the invention, it is preferable that the light-splitting unit is formed so that a division where the zero-order diffracted light among the diffracted light beams enters is different from a division where higher-order diffracted light thereamong enters.

According to the invention, the light-splitting unit is formed so that a division where the zero-order diffracted light among the diffracted light beams enters is different from a division where higher-order diffracted light among the diffracted light beams enters, with the result that only the higher-order diffracted light diffracted by recording layers other than the light-condensed recording layer can be separated and made to fall on a position where no light-receiving elements for generating a focus error signal (hereinafter referred to as "an FES") and the TES exist. This makes it possible to stably generate the TES.

Further, in the invention, it is preferable that the division of the light-splitting unit where the higher-order diffracted light enters, is adapted not to diffract but to transmit the higher-order diffracted light.

According to the invention, the division of the light-splitting unit where the higher-order diffracted light enters, is adapted not to diffract but to transmit the higher-order diffracted light, so that the TES can be stably generated.

Further, in the invention, it is preferable that the division of the light-splitting unit where the higher-order diffracted light enters, is adapted to diffract the higher-order diffracted light toward a position where at least no tracking error signal-generating light-receiving elements exist.

According to the invention, the division of the light-splitting unit where the higher-order diffracted light enters, is adapted to diffract the higher-order diffracted light toward a position where at least no TES-generating light-receiving elements exist, so that the TES can be stably generated.

Further, in the invention, it is preferable that the light-splitting unit is formed so that a division where the zero-order diffracted light among the diffracted light beams enters is a same as a division where higher-order diffracted light among the diffracted light beams enters.

According to the invention, it is preferable that the light-splitting unit is formed so that a division where the zero-order diffracted light among the diffracted light beams enters is a same as a division where higher-order diffracted light among the diffracted light beams enters which are obtained by reflection and diffraction on recording layers other than the light-condensed recording layer. Consequently, the zero-order diffracted light and the higher-order diffracted light enter the division where these light beams are diffracted so as to fall on a position where no light-receiving elements for generating the FES and TES exist, so that the FES and TES can be stably generated.

Further, in the invention, it is preferable that the light-detecting unit further comprises an information-detecting light-receiving element other than a light-receiving element for detecting focus position information indicating information of the light condensing position of the emitted light in a direction parallel to an optical axis of the emitted light with respect to the recording medium, and the light-receiving element for detecting the track position information, wherein the light-splitting unit is adapted to diffract higher-order diffracted light among the diffracted light beams toward the information-detecting light-receiving element which diffracted light beams are obtained by reflection and diffraction on recording layers other than the recording layer on which light is condensed by the light-condensing unit.

According to the invention, the light-detecting unit comprises an information-detecting light-receiving element other than a light-receiving element for detecting focus position information and the light-receiving element for the track position information while the light-splitting unit is adapted to diffract higher-order diffracted light among the diffracted light beams toward the information-detecting light-receiving element which diffracted light beams are obtained by reflection and diffraction on recording layers other than the light-condensed recording layer, with the result that a signal detected by the information-detecting light-receiving element is used for an RF signal serving as an information-reproducing signal so that accuracy of the RF signal can be prevented from decreasing.

Further, in the invention, it is preferable that the optical pickup apparatus further comprises a diffraction element for splitting the light emitted by the light source into at least a main beam and two sub beams, wherein the light-splitting unit has a division where the zero-order diffracted light and higher-order diffracted light of the main beam and sub beams are diffracted so as not to be directed toward the light-receiving element for detecting the track position information, the zero-order diffracted light and higher-order diffracted light being obtained by reflection and diffraction on recording layers other than the recording layer on which light is condensed by the light-condensing unit.

According to the invention, the light-splitting unit has a division where the zero-order diffracted light and higher-order diffracted light of the main beam and sub beams which are obtained by reflection and diffraction on recording layers other than the light-condensed recording layer are diffracted so as not to be directed toward the light-receiving element for detecting the track position information, with the result that the zero-order diffracted light and higher-order diffracted light can be made so as not to enter the light-receiving element for generating the TES so that the TES can be stably generated.

Further, in the invention, it is preferable that the optical pickup apparatus further comprises a diffraction element for splitting the light emitted by the light source into at least a main beam and two sub beams, wherein the light-splitting unit has a division where the zero-order diffracted light of the main beam and sub beams and the higher-order diffracted light of the main beam which are obtained by reflection and diffraction on recording layers other than the recording layer on which light is condensed by the light-condensing unit are diffracted so as not to be directed toward the light-receiving element for detecting the track position information.

According to the invention, the light-splitting unit has a division where the zero-order diffracted light of the main beam and sub beams and the higher-order diffracted light of the main beam which are obtained by reflection and diffraction on recording layers other than the light-condensed recording layer are diffracted so as not to be directed toward the light-receiving element for detecting the track position information with the result that it is possible to suppress deterioration of S/N of the TES and RF signals attributable to light reflected by the light-condensed recording layer.

Further, in the invention, it is preferable that the light-condensing unit is provided so as to be displaceable within a movable range including a neutral position where an optic axis of the light-condensing unit is coaxial with the optical axis of the light emitted by the light source, in a direction perpendicular to the optical axis of the emitted light, and wherein the light-splitting unit has tracking divisions for splitting light used for obtaining the track position information, and a focus division for splitting light used for obtaining focus position information indicating information of the light-condensed position of the emitted light in a direction parallel to the optical axis of the emitted light with respect to the recording medium, and wherein the tracking divisions are formed on both sides of a division where the first-order diffracted light is diffracted so as not to be directed toward the light-receiving element for detecting the track position information.

According to the invention, the light-condensing unit is provided within a range including a neutral position where an optic axis of the light-condensing unit is coaxial with the optical axis of the light emitted by the light source, in a direction perpendicular to the optical axis of the emitted light. The light-splitting unit has a tracking division for splitting light used for obtaining the track position information, and a focus division for splitting light used for obtaining focus position information indicating information of the light-condensed position of the emitted light in a direction parallel to the optical axis of the emitted light with respect to the recording medium.

In the light-splitting unit, tracking divisions are formed on both sides of a division where the first-order diffracted light among the diffracted light beams which are obtained by reflection and diffraction on recording layers other than the light-condensed recording layer, is diffracted so as not to be directed toward the light-receiving element for detecting the track position information, with the result that TES intensity, particularly light intensity of the sub beam is increased so that TES characteristics can be enhanced.

Further, in the invention, it is preferable that the tracking divisions are formed on both sides of a division for diffracting the first-order diffracted light so as not to be directed toward the light-receiving element for detecting the track position information, the tracking divisions being on both sides of one virtual straight line which passes through an optical axis of reflected light entering the light-splitting unit in a state where the light-condensing unit is at the neutral position and which is parallel on the light-splitting unit to a radial direction of the recording medium.

According to the invention, in the light-splitting unit, the tracking divisions are formed on both sides of a division for diffracting the first-order diffracted light so as not to be directed toward the light-receiving element for detecting the track position information, the tracking divisions being on both sides of one virtual straight line which passes through an optical axis of reflected light entering the light-splitting unit in a state where the light-condensing unit is at the neutral position and which is parallel on the light-splitting unit to a radial direction of the recording medium, with the result that the TES intensity, particularly the light intensity of the sub beam is increased so that the TES characteristics can be enhanced.

Further, in the invention, it is preferable that the focus division is formed so as to include an optical axis of reflected light entering the light-splitting unit in a state where the light-condensing unit is at the neutral position.

According to the invention, the focus division is formed so as to include an optical axis of reflected light entering the light-splitting unit in a state where the light-condensing unit is at the neutral position, with the result that the zero-order diffracted light obtained by reflection and diffraction on recording layers other than the light-condensed recording layer can be made to enter the focus division. This makes it possible to prevent the TES from containing the stray light noise caused by zero-order diffracted light so that the TES can be stably generated.

Further, in the invention, it is preferable that the light-splitting unit further has a division formed on one virtual straight line, the division being adapted not to diffract incident light toward either of a light-receiving element for receiving light used for obtaining the track position information and a light-receiving element for receiving light used for obtaining the focus position information.

According to the invention, the light-splitting unit further has a division formed on one virtual straight line, the division being adapted not to diffract incident light toward either of a light-receiving element for receiving light used for obtaining the track position information and a light-receiving element for receiving light used for obtaining the focus position information. By so doing, the so-called stray light attributable to the light reflected by recording layers other than the light-condensed layer is made not to fall on the TES and FES-generating light-receiving elements and thereby, the TES and FES can be prevented from containing the stray light noise so that the TES and FES can be stably generated.

Further, in the invention, it is preferable that the light-splitting unit further has a division formed on one virtual straight line, the division being adapted to, diffract incident light toward a light-receiving element for receiving light used for obtaining the focus position information.

According to the invention, the light-splitting unit further has a division formed on one virtual straight line, the division being adapted to diffract incident light toward a light-receiving element (hereinafter may be referred to "a light-receiving element for obtaining the focus position information")for receiving light used for obtaining the focus position information. By so doing, even in a case where the light obtained by reflection and diffraction on recording layers other than the light-condensed recording layer enters the division formed on the one virtual straight line, the light is made to fall on the light-receiving element for obtaining the focus position information and therefore not made to fall on the light-receiving element for obtaining the track position information, with the result that the TES can be prevented from containing the stray light noise so that the TES can be stably generated.

Further, in the invention, it is preferable that the optical pickup apparatus further comprises a diffraction element for splitting the light emitted by the light source into at least a main beam and two sub beams, wherein the light-splitting unit guides the higher-order diffracted light of the main beam which are obtained by reflection and diffraction on a recording layer other than the recording layer on which light is condensed by the light-condensing unit, to enter a division formed on the one virtual straight line of the light-splitting unit, the division being adapted not to diffract incident light toward either of a light-receiving element for receiving light used for obtaining the track position information and a light-receiving element for receiving light used for obtaining the focus position information.

According to the invention, the light-splitting unit guides the higher-order diffracted light of the main beam obtained by reflection and diffraction on a recording layer other than the light-condensed recording layer, to enter a division which is adapted not to diffract incident light toward either of a light-receiving element for receiving light used for obtaining the track position information and a light-receiving element for receiving light used for obtaining the focus position information. By so doing, the so-called stray light attributable to the light reflected by a recording layer other than the light-condensed layer is made not to fall on the TES and FES-generating light-receiving elements and thereby, the TES and FES can be prevented from containing the stray light noise so that the TES and FES can be stably generated.

Further, in the invention, it is preferable that the optical pickup apparatus further comprises a diffraction-element for splitting the light emitted by the light source into at least a main beam and two sub beams, wherein the light-splitting unit guides higher-order diffracted light of the main beam and sub beams which are obtained by reflection and diffraction on a recording layer other than a recording layer on which light is condensed by the light-condensing unit, to enter a division formed on the one virtual straight line of the light-splitting unit, the division being adapted not to diffract incident light toward either of a light-receiving element for receiving light used for obtaining the track position information and a light-receiving element for receiving light used for obtaining the focus position information.

According to the invention, the light-splitting unit guides the higher-order diffracted light of the main beam and sub beams obtained by reflection and diffraction on a recording layer other than the light-condensed recording layer, to enter a division which is adapted not to diffract incident light toward either of a light-receiving element for receiving light used for obtaining the track position information and a light-receiving element for receiving light used for obtaining-the focus position information. By so doing, the so-called stray light attributable to the light reflected by a recording layer other than the light-condensed layer is made not to fall on the TES and FES-generating light-receiving elements and thereby, the TES and FES can be prevented from containing the stray light noise so that the TES and FES can be stably generated.

Further, in the invention, it is preferable that the light-splitting unit has different diffraction efficiencies in accordance with a polarization direction of light incident on the light-splitting unit.

According to the invention, the light-splitting unit is configured so as to have different diffraction efficiencies in accordance with a polarization direction of light incident on the light-splitting unit and therefore, almost all of the light emitted by the light source is transmitted and the polarization direction of the light reflected by the recording medium is changed by a polarizing plate or the like, thereby allowing diffraction of the reflected light only. This makes it possible to enhance a light use efficiency.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
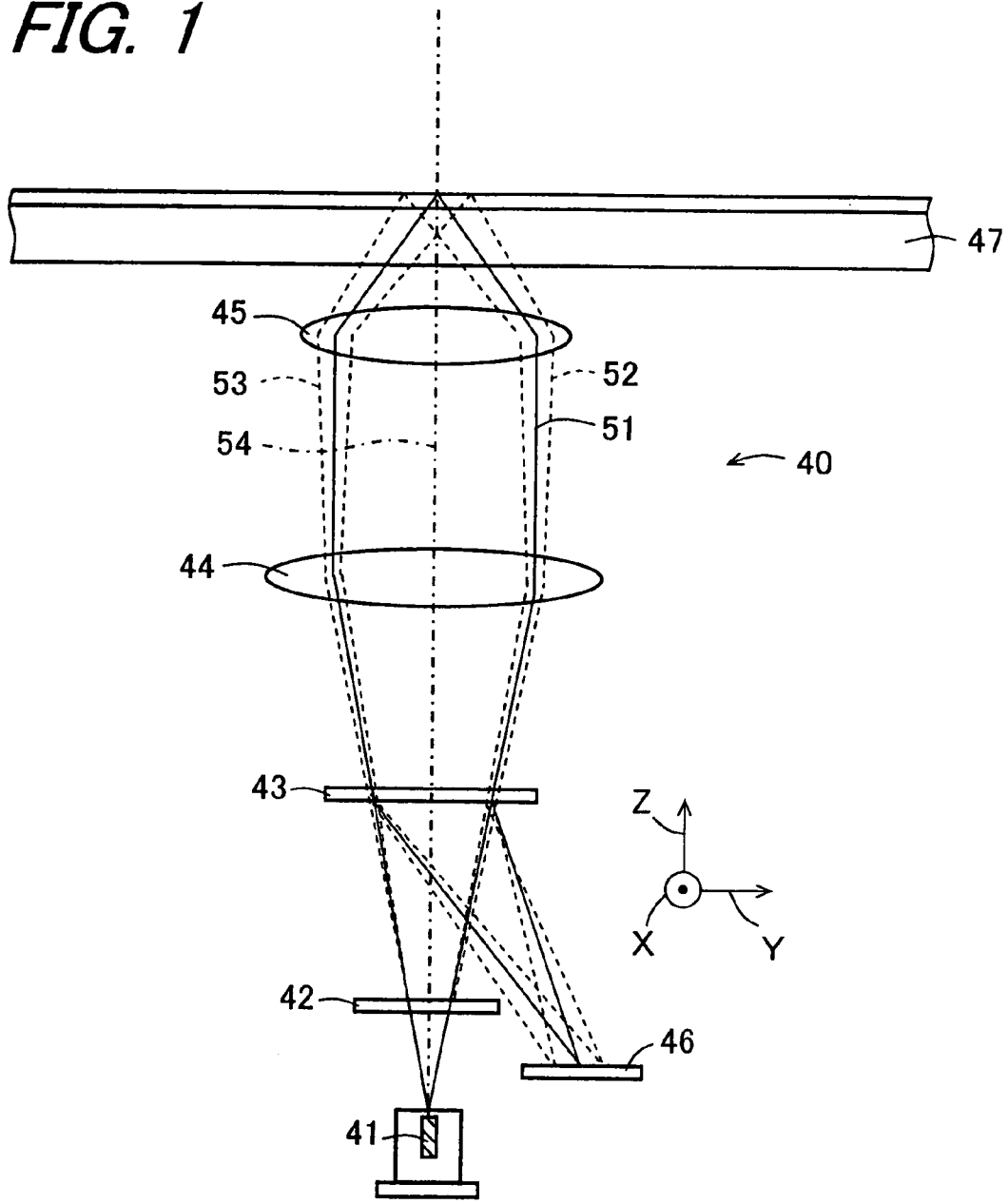
FIG. 1 is a schematic view showing a configuration of an optical pickup apparatus according to a first embodiment of the invention.

Now referring to the drawings, preferred embodiments of the invention are described below.

Hereinbelow, descriptions will be given to a plurality of embodiments for implementing the invention. In the respective embodiments, components corresponding to already-described components in earlier embodiments are denoted by the same reference numerals, and descriptions thereof may be omitted. In a case where only a part of a configuration is described, the other parts of the configuration are the same as those described in the earlier embodiments.

Figure 2:
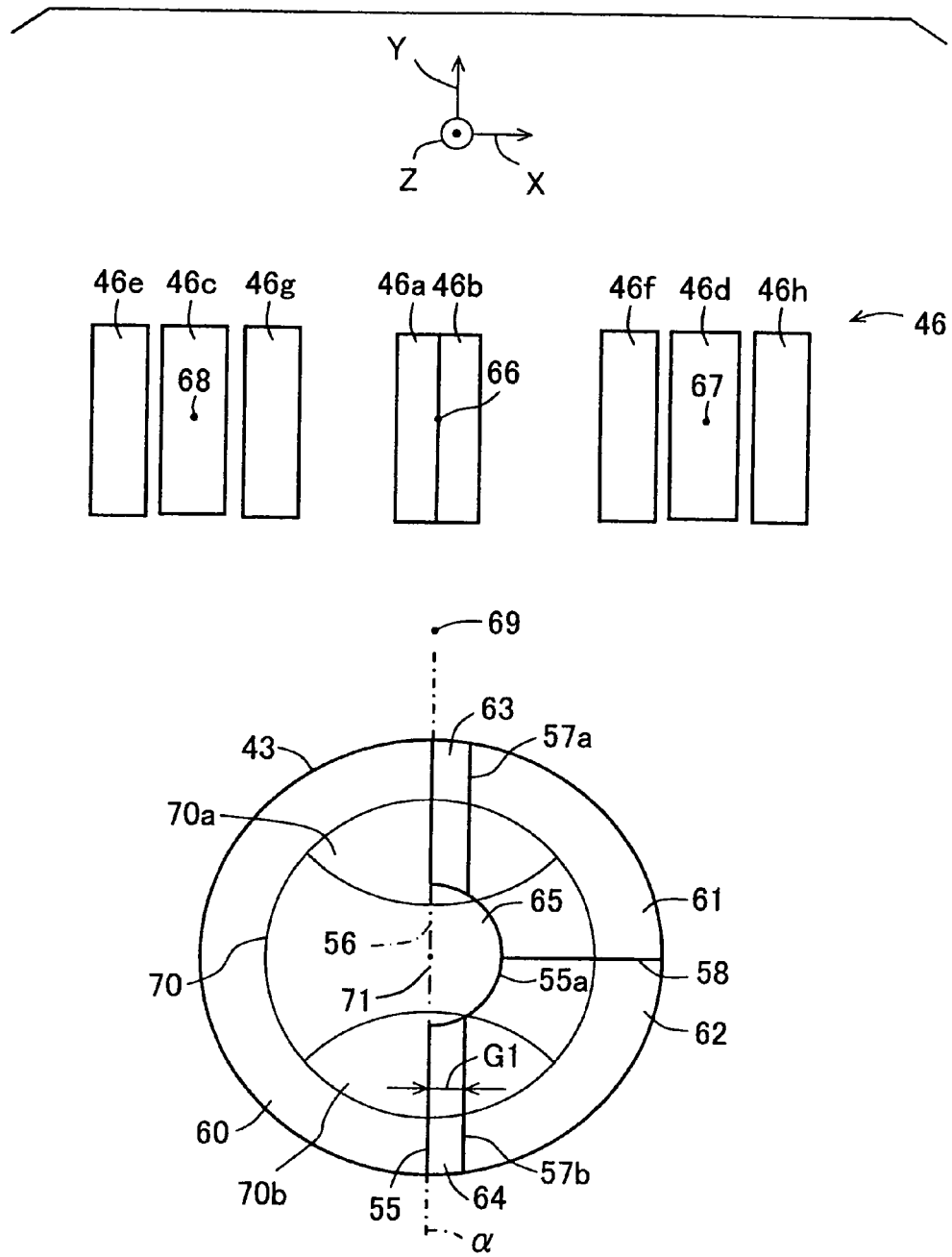
FIG. 2 is a schematic view showing configurations of a hologram element and light-detecting unit provided in the optical pickup apparatus.

FIG. 1 is a schematic view showing a configuration of an optical pickup apparatus 40 according to a first embodiment of the invention. FIG. 2 is a schematic view showing configurations of a hologram element 43 and light-detecting unit 46 provided in the optical pickup apparatus 40. In the following embodiments, a tangential direction to a track formed on an optical disk-shaped recording medium (hereinafter simply referred to "a recording medium") 47 is defined as an X-axis direction, and a radial direction of the recording medium 47 is defined as a Y-axis direction. Note that the radial direction of the recording medium 47 represents a direction along one radial line connecting a point at an intersection between an optical axis of light emitted by the optical pickup apparatus 40 and a recording surface of the recording medium 478, with a center of the recording medium 47. Further, the radial direction is perpendicular to the tangential direction in the recording surface of the recording medium 47. Further, a Z-axis direction represents a direction which is perpendicular to the X-axis direction and Y-axis direction and which is parallel to an optical axis 54 of light emitted by a light source 41. The X-axis direction, Y-axis direction, and Z-axis direction constitute a three-dimensional Cartesian coordinate system where these directions are orthogonal to each other.

The optical pickup apparatus 40 irradiates the recording medium 47 such as a compact disk (abbreviated as CD) and a digital versatile disc (abbreviated as DVD), with light to thereby execute at least one of processes of reproducing information recorded on the recording medium 47 and recording information onto the recording medium 47.

The optical pickup apparatus 40 comprises a light source 41 for emitting light, a diffraction grating 42, a hologram element 43, a collimation lens 44, an objective lens 45, and light-detecting unit 46 having a plurality of light-receiving elements. The light source 41 is realized by a semiconductor laser element. Light emitted by the light source 41 is split by a diffraction element i.e., the diffraction grating 42, into at least three beams; namely, a main beam 51, a first sub beam 52, and a second sub beam 53. The diffraction grating 42 has a structure in which concavities and convexities are regularly formed to diffract the emitted light so as to generate a plurality of beams. The main beam 51 is a main luminous flux for taking out information recorded on the recording medium 47. The sub beams 52 and 53 are sub luminous fluxes which are used for performing a control on a light-condensing position of the main beam 51. The light split by the diffraction grating 42 proceeds through the hologram element 43 and then proceeds through the collimation lens 44 by which the light is made to substantially parallel light, thereafter being guided to the objective lens 45.

The objective lens 45 serving as light-condensing unit condenses the light emitted by the light source 41 onto a recording layer which contains information recorded on the recording medium 47. The objective lens 45 is supported by an actuator (not shown) so as to be displaceable in both of a focus direction which is perpendicular to the recording layer of the recording medium 7 and a radial direction which is perpendicular to the optical axis 54. Displacement of the objective lens 45 in the focus direction and radial direction causes change of a light-condensing position of the emitted light onto the recording medium 47.

The main beam 51 and the first and second sub beams 52 and 53 are condensed by the objective lens 45 onto the recording medium 47. The main beam 51 and first and second sub beams 52 and 53 which have been reflected by the recording medium 47 proceed through the objective lens 45 and then proceed through the collimation lens 44, thereafter being guided to the hologram element 43.

The hologram element 43 serving as light-splitting unit is disposed on an optical path between the light-detecting unit 46 and the objective lens 45. In the hologram element 43 are formed a hologram pattern having a plurality of divisions for splitting the light reflected by the recording medium 47 into a plurality of light beams.

The hologram pattern of the hologram element 43 is formed so that an outline of the hologram pattern when seen from one side in the Z-axis direction has a substantially-circular shape. The hologram pattern of the hologram element 43 is firstly divided into a first division 60 and a remaining part by a first dividing line 55 which is substantially parallel to the Y-axis direction that is a radial direction of the recording medium 47 and a center part of which is a semicircular curved section 55a. The first division 60 is formed so as to have a semicircular protruded region 65 which protrudes toward the remaining division beyond a virtual dividing line 56 connecting both ends of the first dividing line 55 in the semicircular curved section 55a of the first dividing line 55.

The remaining division is divided by second dividing line 57a and 57b which are drawn in parallel with the Y-axis direction at a distance G1 in the X-axis direction from a straight-line portion of the first dividing line 55, into a fourth division 63 and a fifth division 64 which are two divisions arranged along with each other in the Y-axis direction, and a further remaining division. The second dividing lines 57a and 57b are formed separately as two lines, each of which makes contact with the curved section 55a of the first dividing line 55 forming the protruded region 65.

The further remaining division is divided by a third dividing line 58 which is parallel to the X-axis direction, into a second division 61 and a third division 62. Consequently, the hologram element 43 is formed so as to have five divisions; specifically, the first to fifth divisions 60 to 64. The respective divisions 60 to 64 of the hologram element 43 have different directions, shapes, and pitches of the concavities and convexities constituting the hologram pattern, because of different directions of light diffracted in the respective divisions 60 to 64.

At the outset, a description will be given to a diffracting operation of the hologram element 43 with respect to light reflected by a recording layer (hereinafter may be referred to "a light-condensed recording layer")on which light is condensed by the objective lens 45. The main beam 51 which is reflected by the light-condensed recording layer and then enters the hologram element 43 is diffracted in the first division 60 toward a boundary between a first light-receiving element 46a and a second light-receiving element 46b so as to fall on a first fallen point 66. The main beam 51 diffracted in the second division 61 is directed toward a fourth light-receiving element 46d so as to fall on a second fallen point 67. The main beam 51 diffracted in the third division 62 is directed toward a third light-receiving element 46c so as to fall on a third fallen point 68. And by each of the fourth and fifth divisions 63 and 64, the main beam 51 is made to fall on a fourth fallen point 69 where no light-receiving elements exist.

The first and second sub beams 52 and 53 which are reflected on the light-condensed recording layer and then enters the hologram element 43 are diffracted in the first division 60 so as to fall on positions on both sides of the first light-receiving element 46a and second light-receiving element 46b, where no light-receiving elements exist. The first and second sub beams 52 and 53 diffracted in the second division 61 are directed toward the sixth light-receiving element 46f and eight light-receiving element 46h so as to fall thereon. The first and second sub beams 52 and 53 diffracted in the third division 62 are directed toward the fifth light-receiving element 46e and seventh light-receiving element 46g so as to fall thereon. And by each of the fourth and fifth divisions 63 and 64, positions where no light-receiving elements exist in the vicinity of the fourth fallen point 69 are irradiated respectively with the first and second sub beams 52 and 53 as in the case of the main beam 51.

Subsequently, a description will be given to an information-reproducing operation of the optical pickup apparatus 1, for example, on the basis of the light reflected by the light-condensed recording layer. The light source 41 emits red light having a wavelength of 650 nm, for example, when used for reproducing a DVD. The emitted light emitted by the light source 42 proceeds through the diffraction grating 42 where the emitted light is split into the main beam 51 and the first and second sub beams 52 and 53. In the following descriptions, the main beam 51 and the first and second sub beams 52 and 53 may be simply referred to as "light". The light diffracted by the diffraction grating 42 proceeds through the hologram element 43 and then enters the collimation lens 44. The light incident on the collimation lens 44 is made to substantially parallel light which then proceeds through the objective lens 45 to be condensed on one recording layer of the recording medium 47. At this time, the main beam 51 is condensed on a main track while the first and second sub beams 52 and 53 are condensed on a sub track.

Light reflected by the main track and sub track of the light-condensed layer of the recording medium 47 proceeds through the objective lens 45 and collimation lens 44 again and then enters the hologram element 43 where the light is diffracted in each of the divisions 60 to 64 as described above so as to fall on the light-receiving elements or the position where no light-receiving elements exist. Signal information is read out from the reflected light fallen on the light-receiving element.

In the present embodiment, on the basis of optical signals obtained from the respective light-receiving elements 46a to 46h where the light reflected by the light-condensed recording layer enter, a signal-generating unit (not shown) generates a focus error signal (abbreviated as FES), a tracking error signal (abbreviated as TES), and an information-reproducing signal (abbreviated as RF). A servo signal-generating portion in the signal-generating unit generates the FES and TES. By use of these servo signals, a servo signal processor (not shown) performs a focus servo control and a track servo control by adjusting a position in the focus direction and track direction of the objective lens 45 mounted on the actuator so that a light-condensed point formed by the objective lens 45 follows a predetermined track on the light-condensed recording layer of the recording medium 47.

The FES can be obtained by the following formula (1):

$$FES=Sa-Sb \qquad (1)$$

(wherein Sa represents a signal detected by the first light-receiving element 46a; and Sb represents a signal detected by the second light-receiving element 46b.) The formula (1) indicates that the focus servo control is conducted by means of the knife edge method in which is used a knife edge having a boundary of the first dividing line 55 including the curved section 55a in the hologram element 43. In this case, owing to the protruded region 65 having a semicircular shape included in the first division 60, the amplitude of the FES is made smaller and moreover, a positive component and a negative component of the FES become unbalanced, when compared to a case of having no protruded region 65. Furthermore, shifting of the first dividing line 55 in the X-axis direction deteriorates the signal amplitude of the FES and the balance between the positive and negative components of the FES.

Accordingly, in the hologram element 43 according to the embodiment, in order to prevent the FES from having a decreased amplitude and unbalanced components, the first dividing line 55 is set to be positioned on an axial line a which passes through an optical axis 71 of a reflected-light spot 70 of light incident on the hologram element 43 and which extends in the Y-axis direction.

In a case of applying a differential phase detection (abbreviated as DPD) method to detect the TES, the TES can be obtained by the following formula (2):

$$TES(DPD)=Sc-Sd \qquad (2)$$

(wherein Sc represents a signal detected by the third light-receiving element 46c; and Sd represents a signal detected by the fourth light-receiving element 46d.)

This formula is based on a phenomenon that ± first-order pit diffracted light diffracted in a pit formed in a recording layer of the recording medium 47 is superposed on the reflected-light spot 70 whereby being subjected to interference and as a result, + first-order pit diffracted light 70a and − first-order pit diffracted light 70b are formed in light and dark patterns.

More specifically, in a case where laser light corresponds to a center of the pit, the ± first-order pit diffracted light 70a and 70b are formed at positions on the hologram element 43, which are symmetrical to each other with respect to the optical axis 71, with the result that a phase difference between signals outputted by the light-emitting elements for detecting TES is zero. In contrast, the laser light is deviated from the center of the pit, a level of interference between the + first-order pit diffracted light 70*a* and the light of the reflected-light spot 70 which is zero-order diffracted light reflected by the pit, is different from a level of interference between the − first-order pit diffracted light 70*b* and the light of the reflected-light spot 70, with the result that a phase difference is generated between signals outputted by the light-emitting elements for detecting TES. This eventually means that the phase differences of the main beam 51 detected by the third light-receiving element 46*c* and the fourth light-receiving element 46*d* can be used to obtain the TES representing a degree of deviation of the laser light in the Y-axis direction i.e. the radial direction, from the signal pit.

In a case where a differential push pull (abbreviated as DPP) method is used to detect the TES, the TES can be obtained by the following formula (3):

$$TES(DPP)=(Sc-Sd)-k\times\{(Se-Sf)+(Sg-Sh)\} \quad (3)$$

(wherein Sc represents the third light-receiving element 46*c*; Sd represents the fourth light-receiving element 46*d*; Se represents the fifth light-receiving element 46*e*; Sf represents the sixth light-receiving element 46*f*; Sg represents the seventh light-receiving element 46*g*; and Sh represents the eighth light-receiving element 46*h*.)

In the formula (3), the first term (Sc−Sd) signifies a push pull signal of the main beam 51, and the second term (Se−Sf) and (Sg−Sh) signifies push pull signals of the first and second sub beams 52 and 53. A ratio of light intensity between the main beam 51 and the first and second sub beams 52 and 53 is represented by k which can be determined depending on a depth of concavities of the diffraction grating 42. Further, in a case where the DPP method is used, there needs to be a 180-degree phase lag between the push pull signals obtained from the first and second sub beams 52 and 53 and the push pull signal obtained from the main beam 51. Accordingly, the pitches of the concavities and convexities of the diffraction grating 42 are set, for example, so that the first and second sub beams 52 and 53 are condensed on a groove adjacent to a land acting as a main track of the recording medium 47, on which the main beam 51 is condensed.

On the basis of the FES obtained by the formula (1), the focus servo control is performed while the track servo control is performed on the basis of the TES obtained by the formula (2) or the formula (3). By so doing, it is possible to condense the light emitted by the light source 41 on the predetermined track of the recording medium 47.

The RF signal serving as an information-reproducing signal can be obtained by the following formula (4):

$$RF=Sa+Sb+Sc+Sd \quad (4)$$

(wherein Sa represents the first light-receiving element 46*a*; Sb represents the second light-receiving element 46*b*; Sc represents the third light-receiving element 46*c*; and Sd represents the fourth light-receiving element 46*d*).

Subsequently, a description will be given to a diffracting operation of the hologram element 43 for the zero-order diffracted light and higher-order diffracted light diffracted by a recording layer other than the light-condensed recording layer. In the following description, a description will be given to, among the higher-order diffracted light beams, only the first-order diffracted light having a higher diffraction order than that of the zero-order diffracted light.

Figure 3:
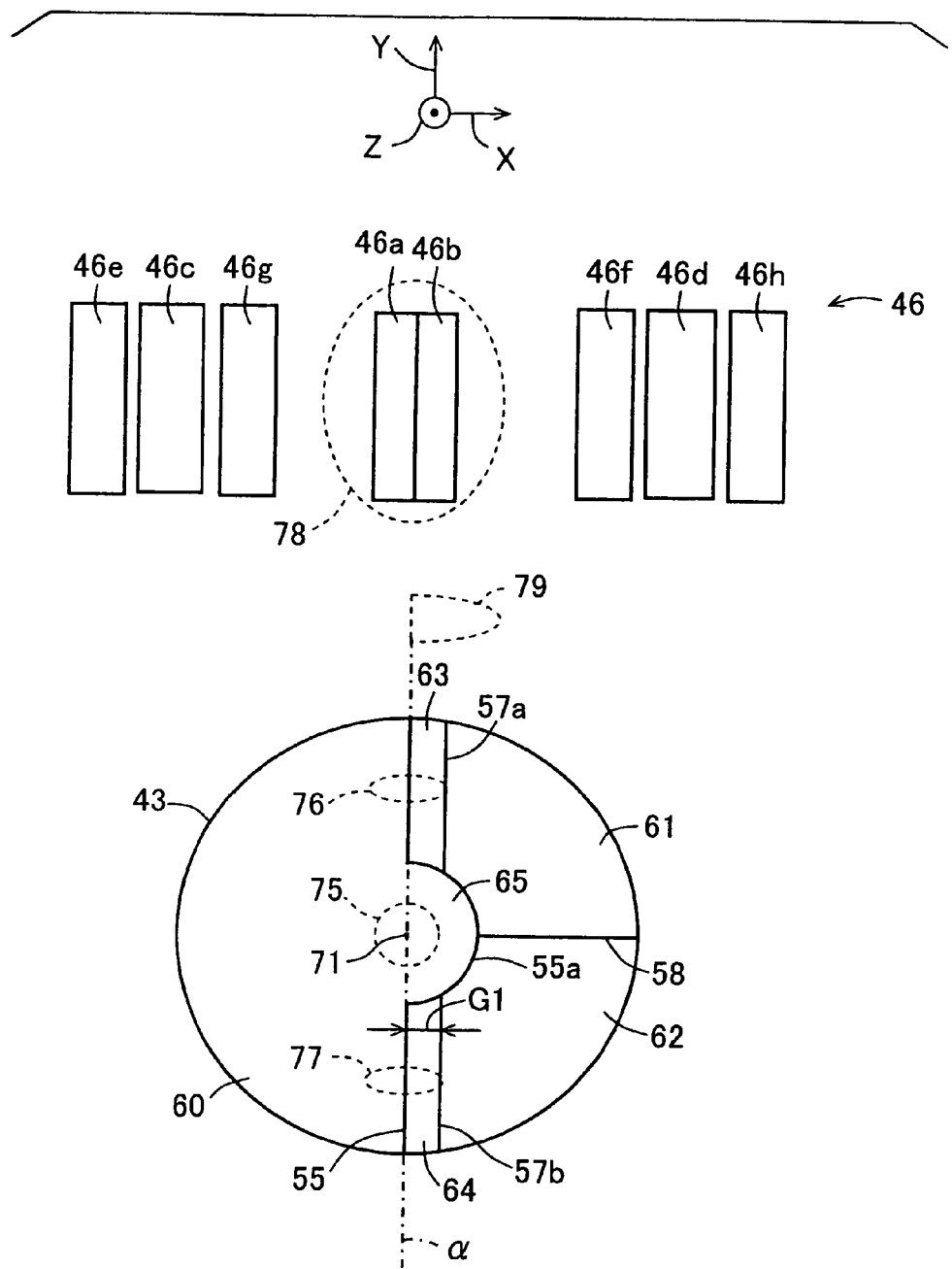
FIG. 3 is a view of assistance in explaining an outline of process that light diffracted by a recording layer other than a light-condensed recording layer on the objective lens side enters the hologram element where the light is diffracted.

FIG. 3 is a view of assistance in explaining an outline of process that the light diffracted by a recording layer other than the light-condensed recording layer on the objective lens side enters the hologram element 43 where the light is diffracted. The zero-order diffracted light diffracted by the recording layer (hereinafter may be referred to "a second recording layer")other than the light-condensed recording layer (hereinafter may be referred to "a first recording layer") enters the hologram element 43, more specifically, in the vicinity of the optical axis 71 of the light reflected by the first recording layer and at a position in the protruded region 65 of the first division 60 so that a zero-order diffracted light spot 75 of the main beam 51 is formed. At this time, a radius of the semicircular curved section 55*a* of the first dividing line 55, forming the protruded region 65 is set so that not only the zero-order diffracted light of the main beam 51, but also the zero-order diffracted light beams (not shown) of the first and second sub beams 52 and 53 fall on the protruded region 65 of the first division 60. By so doing, the zero-order diffracted light diffracted by the second recording layer is diffracted by the first division 60 so as to be directed toward the first and second light-receiving elements 46*a* and 46*b*. Since the zero-order diffracted light thus diffracted on the second recording layer does not fall as stray light on the third to eighth light-receiving elements 46*c* to 46*h* for generating the TES, it is possible to generate the TES which does not contain noise caused by the zero-order diffracted light.

Further, a size of the protruded region 65 of the first division 60 is determined in consideration of the following matters. On condition that a refractive index at the boundary between the first recording layer and the second recording layer is represented by nd while a dimension in thickness between the recording layers is represented by td, the zero-order diffracted light spot 75 formed by the light reflected by the second recording layer is made largest with the largest refractive index nd and the smallest dimension in thickness td. Accordingly, the size of the protruded region 65 of the first division 60; that is, the radius of the curved section 55*a* of the first dividing line 55 is set so that the largest zero-order diffracted light spot 75 is included within the first division 60.

A position of the zero-order diffracted light spot 75 is moved in the Y-axis direction in accordance with displacement of the objective lens 45 in the Y-axis direction. Accordingly, the radius of the curved section 55*a* of the first dividing line 55 is set so that the zero-order diffracted light spot 75 can be included within the first division 60, regardless of a fluctuating position of the zero-order diffracted light spot 75. Means for changing the size of the protruded region 65 are not limited to changing of the radius of the curved section 55*a* of the first dividing line 55, but may be shaping of the protruded region 65 into a semiellipse extending in the Y-axis direction so that the zero-order diffracted light spot 75, a position of which fluctuates in the Y-axis direction, can be included within the first division 60.

Furthermore, the shape of the protruded region 65 is not limited to the semicircle or semiellipse, but it is possible to have any shape and dimension with which the zero-order diffracted light spot 75 formed of the light diffracted by the second recording layer is included in the first division 60 and through which the light does not fall on any of the third to eighth light-receiving elements 46*c* to 46*h*. Alternatively, even in a case where a part of the light falls on the third to eighth light-receiving elements 46*c* to 46*h*, the shape of the protruded region 65 is not limited to the above-mentioned shape when a received amount of fallen light is smaller than a received amount of light reflected by the first recording layer.

The zero-order diffracted light diffracted by the second recording layer falls as stray light on the first and second light-receiving elements 46*a* and 46*b* for generating the FES, where the fallen light forms an extremely blurred fallen spot 78, resulting in a spread-out of an intensity distribution of light incident as stray light and a sufficiently small amount of light with respect to the light reflected by the first recording layer. Moreover, the FES is obtained by a differential between the first light-receiving element 46a and the second light receiving element 46b and therefore, in a case where both of the first and second light-receiving elements 46a and 46b are irradiated with the light, the light on the first light-receiving element 46a and the light on the second light-receiving element 46b are cancelled out, thereby hardly causing noise.

Subsequently, the first-order of the main beam 51 diffracted light diffracted on the second recording layer enters the hologram element 43 so as to form thereon a first light spot 76 of the, first-order diffracted light and a second light spot 77 of the first-order diffracted light, between which the zero-order diffracted light spot 75 of the main beam 51 lies and which are arranged in the Y-axis direction. The first-order diffracted light is incident on the first dividing line 55 which is a straight line corresponding to the axial line a and around which the first light spot 76 of the first-order diffracted light expands in the first division 60 and the fourth division 63 on the hologram element 43. The first-order diffracted light is incident on the first dividing line 55 which is a straight line corresponding to the axial line α and around which the second light spot 77 of the first-order diffracted light expands in the first division 60 and the fifth division 64 on the hologram element 43.

Through the fourth and fifth divisions 63 and 64 of the hologram element 43 which the first-order diffracted light diffracted on the second recording layer enters, the light is diffracted so as not to be directed toward the first and second light-receiving elements 46a and 46b for detecting focus position information which indicates information of the light-condensed position of the emitted light onto the recording medium 47 with respect to a direction in parallel with the optical axis 54 of the emitted light, or so as not to be directed toward the third to eighth light-receiving elements 46c to 46h for detecting track position information which indicates information of the light-condensed position of the emitted light onto the recording medium 47 with respect to a direction perpendicular to the optical axis 54 of the emitted light.

Through the fourth and fifth divisions 63 and 64, all of the first-order diffracted light beams (not shown) of the main beam 51, first and second sub beams 52 and 53 which are diffracted on the second recording layer, are diffracted so as to be directed toward a position where no light-receiving elements exist so that a first diffracted light fallen spot 79 is formed. Among the first-order diffracted light beams diffracted on the second recording layer, the first-order diffracted light of the main beam 51 incident on the first division 60 is diffracted so as to be directed toward the first and second light-receiving elements 46a and 46b while the first-order diffracted light of the first and second sub beams 52 and 53 is diffracted so as to be directed toward positions on both sides of the first light-receiving element 46a and the second light-receiving element 46b, where no light-receiving elements exist.

As described above, the hologram element 43 of the optical pickup apparatus 40 is formed so as to have the fourth and fifth divisions 63 and 64 through which the first-order diffracted light beams of the main beam 51 and first and second sub beams 52 and 53 diffracted on the second recording layer are diffracted so as not to be directed toward the third to eighth light-receiving elements 46c to 46h for generating the TES. Accordingly, the first-order diffracted light diffracted on the second recording layer does not fall as stray light on the third to eighth light-receiving elements 46c to 46h for generating the TES and as a result, the TES can be generated without noise caused by the first-order diffracted light diffracted on the second recording layer so that a stable generation of the TES is made possible.

Subsequently, a description will be given to sizes of the fourth and fifth division 63 and 64. When a distance between a straight-line portion of the first dividing line 55 and the second dividing lines 57a and 57b, that is, in other words, a distance G1 between the axial line α and the second dividing lines 57a and 57b is too large, a light amount of the light reflected by the first recording layer decreases and moreover, the amplitudes of the TES and RF signals are reduced, so that a certain level of restriction is imposed on the size of the distance G1.

However, among the first-order diffracted light beams of the main beam 51 and first and second sub beams 52 and 53 diffracted on the second recording layer, which fall on and around the first dividing line 55 that is a straight line corresponding to the axial line α, the first-order diffracted light of the first and second sub beams 52 and 53 has a sufficiently small amount of light compared to the light amount of the light reflected by the first recording layer in view of both of a ratio of light amount of the first and second sub beams 52 and 53 to the main beam 51 and a ratio of diffraction efficiency of the first-order diffracted light to the zero-order diffracted light, so that an influence of the first-order diffracted light of the first and second sub beams 52 and 53 is also small.

Consequently, when setting a length of the distance G1, the fourth and fifth division 63 and 64 are formed so as to be able to include at least an incident light spot of the first-order diffracted light of the main beam 51 among the first-order diffracted light beams of three beams diffracted on the second recording layer. The distance G1 is set, however, to such a length that a certain part of an incident light spot of the first-order diffracted light of the first and second sub beams 52 and 53 is not included unavoidably in the fourth and fifth division 63 and 64. By so doing, it is possible to suppress the decrease of signal amount of the zero-order diffracted light reflected on the first recording layer and to suppress the decrease of amplitudes of the TES and RF signals.

Furthermore, in the hologram element 43 according to the embodiment, even when the objective lens 45 is shifted in the Y-axis direction, the fourth and fifth division 63 and 64 are formed up to the outermost periphery of the hologram pattern so that the first-order diffracted light of the main beam 51 entering the hologram element 43 to form thereon the first and second light spots 76 and 77 does not enter the second and third divisions 61 and 62. However, the fourth and fifth division 63 and 64 are not limited to the shapes according to the invention, but may be into shapes not reaching to the outermost periphery of the hologram pattern when the spot movement amount is small, for example, in a case where the objective lens 45 is shifted in the Y-axis direction with respect to a radius of a circle forming the outermost periphery of the hologram pattern on the hologram element 43 due to tracking caused by eccentricity of the rotation center and track of the recording medium 47, and the first and second light spots 76 and 77 of the first-order diffracted light are shifted in directions of the outermost periphery of the hologram pattern. Further, the second dividing lines 57a and 57b may be formed into straight lines or curved shapes such that the distance G1 is gradually smaller as the lines come closer to the periphery of the hologram pattern.

By configuring the hologram element 43 so as to have the five divisions 60 to 64 as described above, when the incident light exiting from the objective lens 45 is condensed on the first recording layer, the zero-order diffracted light and first-order diffracted light diffracted on the second recording layer become stray light, thereby allowing a decrease in an amount of the light entering the third to eight light-receiving elements 46c to 46h for generating the TES. This makes it possible to reduce stray light noise contained in the TES so as to generate the stable TES, allowing a stable track servo control. Furthermore, it is possible to suppress the amplitude of the FES and deterioration in balance between the positive and negative components so that the stable focus servo control can be performed.

Figure 4:
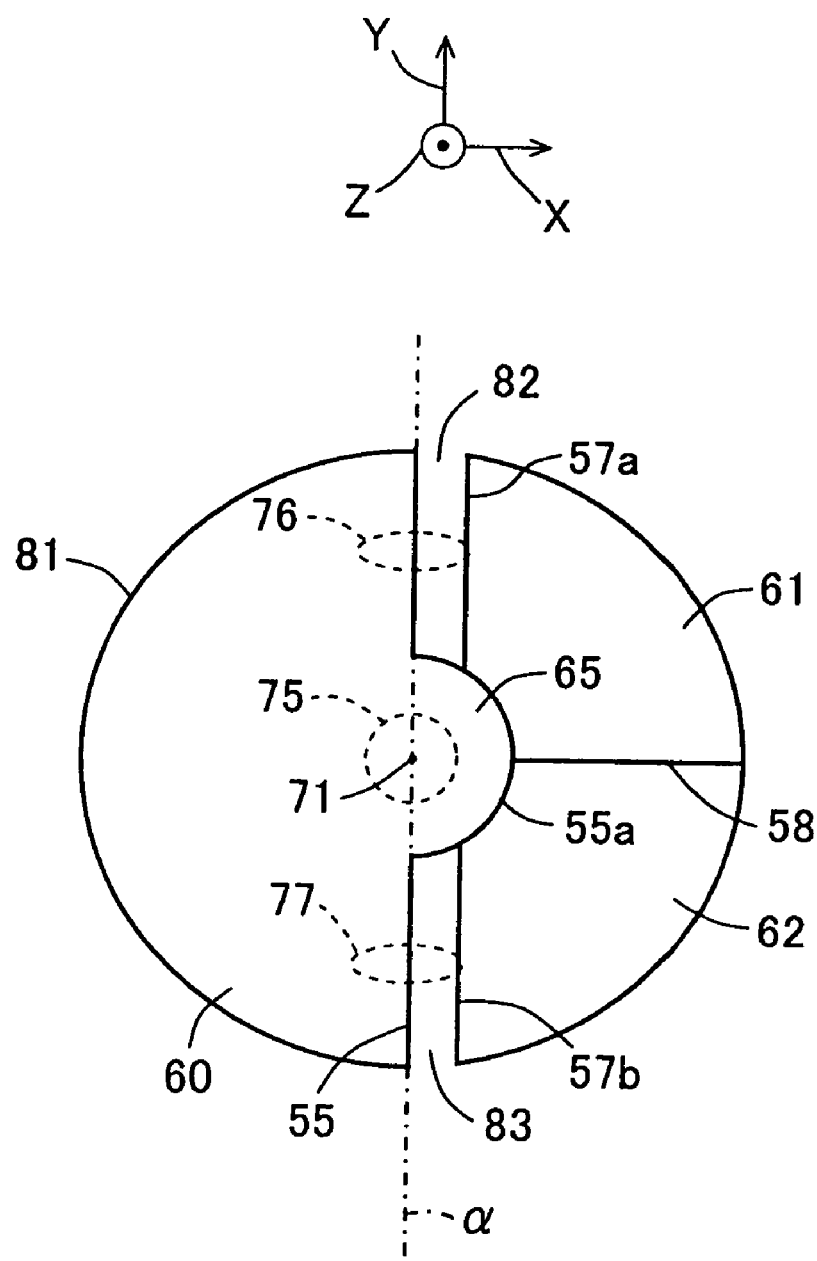
FIG. 4 is a view showing a configuration of a hologram element provided in an optical pickup apparatus according to a second embodiment of the invention.

FIG. 4 is a view showing a configuration of a hologram element 81 provided in an optical pickup apparatus according to a second embodiment of the invention. The optical pickup apparatus according to the present invention is similar to the above-described optical pickup apparatus 40 according to the first embodiment. Accordingly, only different parts will be described, and the components corresponding to those in the first embodiment will be denoted by the same reference numerals so that common descriptions thereof will be omitted.

The optical pickup apparatus according to the embodiment comprises another hologram element 81 instead of the above-described hologram element 43 according to the first embodiment. The hologram element 81 according to the embodiment is formed so that the first-order diffracted light is not diffracted, but is just transmitted by the fourth and fifth divisions 82 and 83 where the first-order diffracted light diffracted on the second recording layer enters. In other words, concavo-convex shapes for diffracting light are not formed on the fourth and fifth division 82 and 83 by which the entering first-order diffracted light diffracted on the second recording layer, particularly the first-order diffracted light of the main beam 51 is therefore transmitted so that the first-order diffracted light is made not to fall on the third to eighth light-receiving elements 46c to 46h for generating the TES. This allows the optical pickup apparatus according to the embodiment to achieve the same effects as those of the above-described optical pickup apparatus 40 according to the first embodiment.

Figure 5:
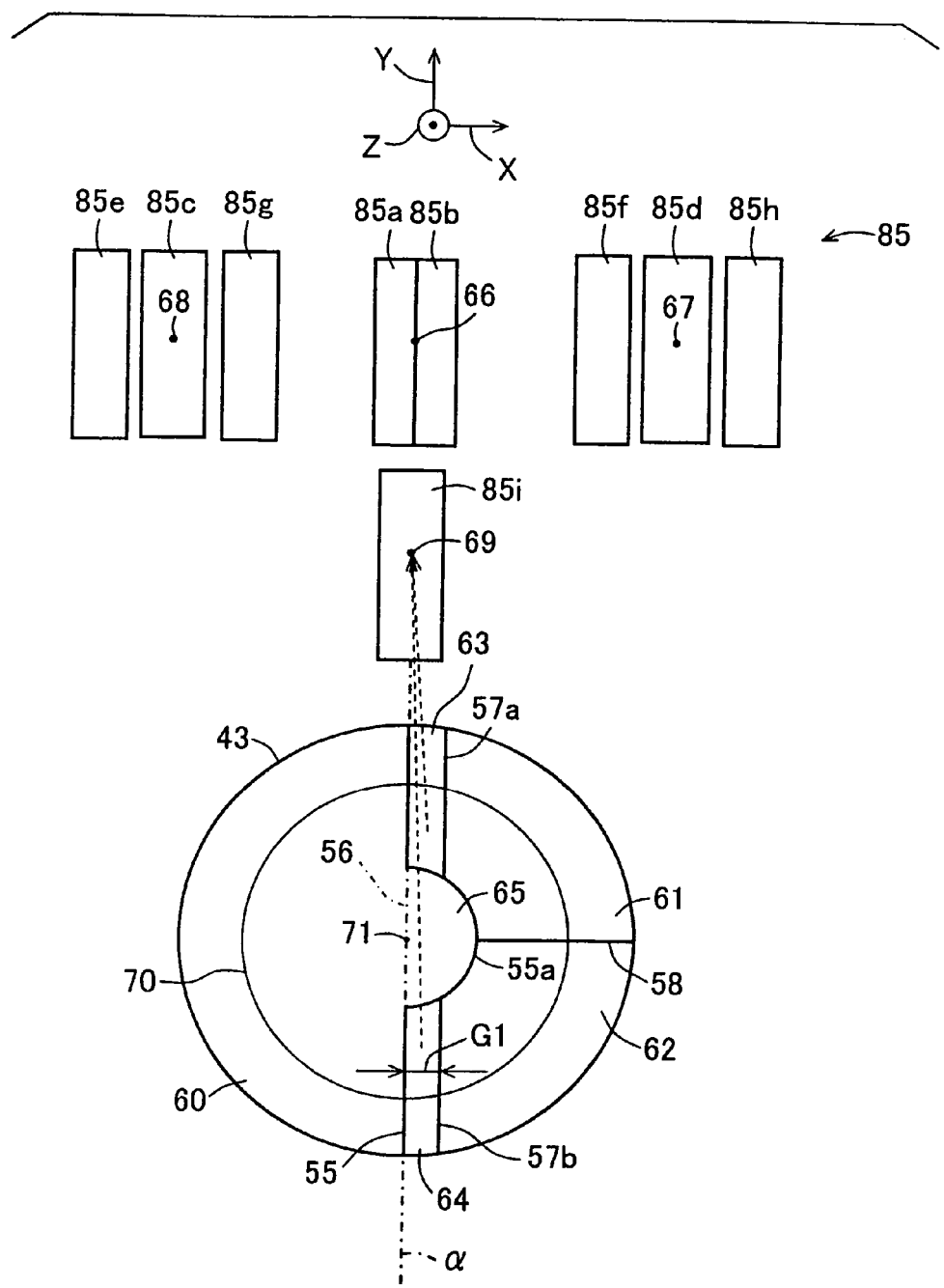
FIG. 5 is a view showing configurations of a hologram element and light-detecting unit provided in an optical pickup apparatus according to a third embodiment of the invention.

FIG. 5 is a view showing configurations of a hologram element 43 and light-detecting unit 85 provided in an optical pickup apparatus according to a third embodiment of the invention. The optical pickup apparatus according to the present invention is similar to the above-described optical pickup apparatus 40 according to the first embodiment. Accordingly, only different parts will be described, and the components corresponding to those in the first embodiment will be denoted by the same reference numerals so that common descriptions thereof will be omitted.

The optical pickup apparatus according to the embodiment comprises another light-detecting unit 85 instead of the above-described light-detecting unit 46 according to the first embodiment. The light-detecting unit 85 according to the embodiment further comprises an information-detecting light-receiving element 85i, in addition to first and second light-receiving element 85a and 85b for detecting the focus position information, and third to eighth light-receiving elements 85c to 85h for detecting the track position information. Through the fourth and fifth divisions 63 and 64 of the hologram element 43, among the diffracted light beams obtained by reflection and diffraction on the second recording layer other than the first recording layer on which the light is condensed by the objective lens 45, the first-order diffracted light is diffracted so as to be directed toward the information-detecting light-receiving element 85i.

In other words, the information-detecting light-receiving element 85i is provided between the first and second light-receiving elements 85a and 85b for detecting the focus position information and the hologram element 43 when seen from one side in the Z-axis direction so that the information-detecting light-receiving element 85i is arranged in the Y-axis direction with respect to the first and second light-receiving elements 85a and 85b. The information-detecting light-receiving element 85i is positioned at a fourth fallen point 69 on which light diffracted in the fourth and fifth divisions 63 and 64 falls in a condensed state, but not limited to the example mentioned above, if the position of the information-detecting light-receiving element 85i is not any of the positions of the information-detecting light-receiving elements 85a to 85h.

In the embodiment is used an RF signal that is a signal detected by the information-detecting light-receiving element 85i from the light which has been diffracted in the fourth and fifth divisions 63 and 64. Accordingly, the RF signal is obtained by the following formula (5):

$$RF = Sa + Sb + Sc + Sd + Si \qquad (5)$$

(wherein Sa represents the first light-receiving element 85a; Sb represents the second light-receiving element 85b; Sc represents the third light-receiving element 85c; Sd represents the fourth light-receiving element 85d; and Si represents the information-detecting light-receiving element 85i.)

This allows the optical pickup apparatus according to the embodiment to achieve the same effects as those of the above-described optical pickup apparatus 40 according to the first embodiment. In addition, it is possible to make efficient use of the light diffracted in the fourth and fifth divisions 63 and 64, as the RF signal, so that the RF signal of excellent quality can be obtained. As a result, a stable information reproduction can be realized.

Figure 6:
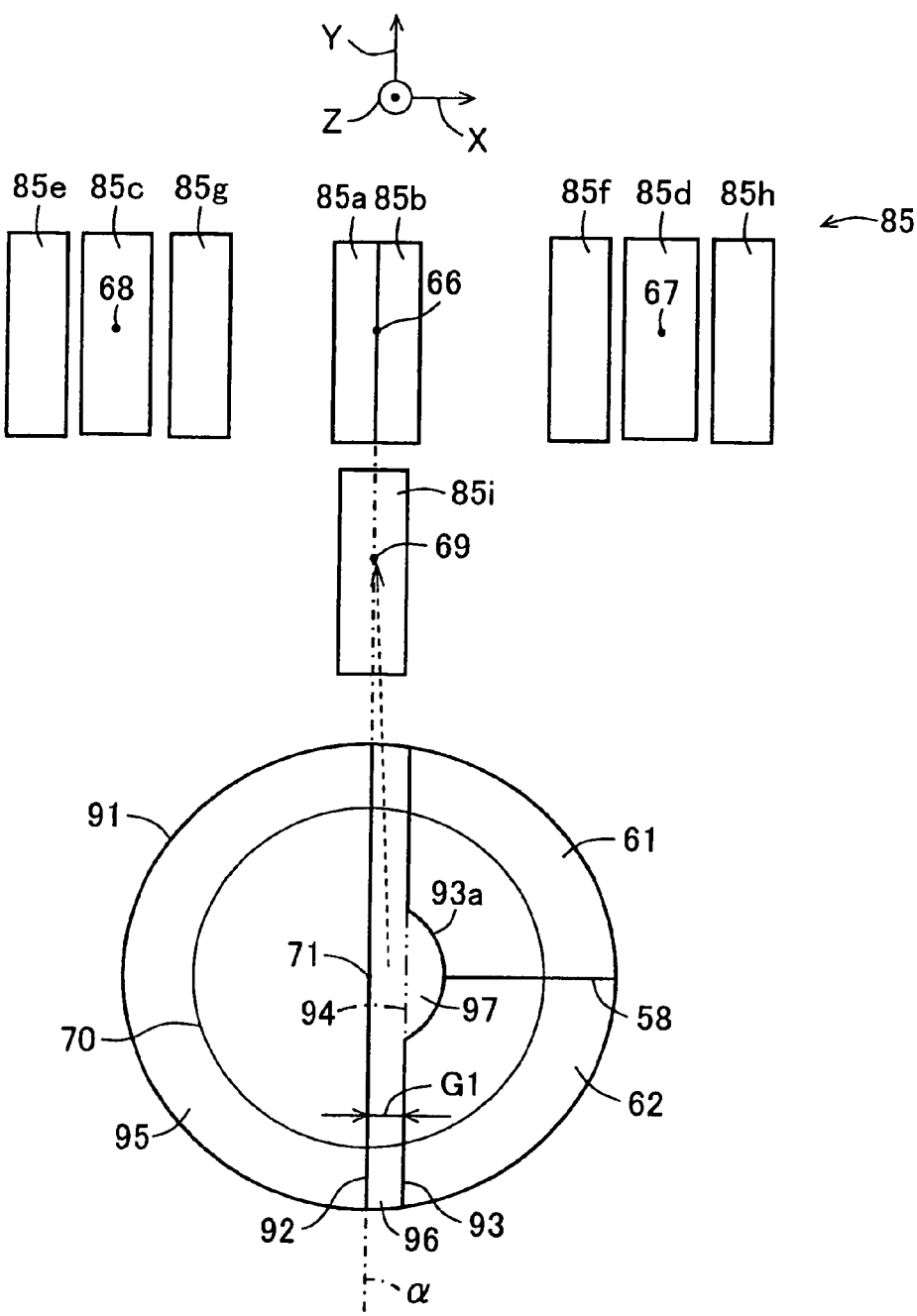
FIG. 6 is a view showing configurations of a hologram element and light-detecting unit provided in an optical pickup apparatus according to a fourth embodiment of the invention.

FIG. 6 is a view showing configurations of a hologram element 91 and light-detecting unit 85 provided in an optical pickup apparatus according to a fourth embodiment of the invention. The optical pickup apparatus according to the present invention is similar to the above-described optical pickup apparatus according to the third embodiment. Accordingly, only different parts will be described, and the components corresponding to those in the third embodiment will be denoted by the same reference numerals so that common descriptions thereof will be omitted.

The optical pickup apparatus according to the embodiment comprises another hologram element 91 instead of the above-described hologram element 43 according to the third embodiment. The hologram element 91 according to the embodiment is formed so that, among the diffracted light beams diffracted on the second recording layer other than the first recording layer on which the light is condensed by the objective lens 45, the zero-order diffracted light enters a division which corresponds to a division which the first-order diffracted light enters. More specifically, a hologram pattern of the hologram element 91 is formed so that an outline of the hologram pattern when seen from one side in the Z-axis direction has a substantially-circular shape. The hologram pattern of the hologram element 91 is firstly divided into a semicircular first division 95 and a remaining part by a first dividing line 92 that is a straight line which is substantially parallel to the Y-axis direction and which corresponds to the axial line α.

The remaining part is then divided into a fourth division 96 and a further remaining part by a second dividing line 93 which is formed in parallel with the Y-axis direction and at a distance G1 away in the X-axis direction from the first dividing line 92. The second dividing line 93 has an arch-shaped curved section 93a protruding toward the further remaining part beyond a virtual dividing line 94 connecting both ends of the second dividing line 93. The fourth division 96 is formed so as to have a protruded region 97 formed by the arch-shaped curved section 93a of the second dividing line 93, which protrudes toward the further remaining part.

The further remaining division is further divided, as in the cases of the above-described first to third embodiments, by the third dividing line 58 which is parallel to the X-axis direction, into the second division 61 and the third division 62. Consequently, the hologram element 91 is formed so as to have four divisions; specifically, the first division 95, the second division 61, the third division 62, and the fourth division 96.

The hologram element 91 according to the embodiment has the fourth division 96 of which shape is made, as a division, by combination of the fourth and fifth divisions 63 and 64 and semicircular protruded region 65 of the first division 60 in the above-described hologram element 43 according to the third embodiment.

The zero-order diffracted light and first-order diffracted light diffracted on the second recording layer enter the fourth division 96 of the hologram element 91. In the fourth division 96, the zero-order diffracted light and first-order diffracted light diffracted on the second recording layer is diffracted toward the information-detecting light-receiving element 85i of the light-detecting unit 85, on which the light is made to fall. The light received by the information-detecting light-receiving element 85i is used for the RF signal as in the case of the above-described third embodiment. Consequently, also in the optical pickup apparatus according the embodiment, the RF signal can be obtained by the following formula (6):

$$RF=Sa+Sb+Sc+Sd+Si \quad (6)$$

(wherein Sa represents the first light-receiving element 85a; Sb represents the second light-receiving element 85b; Sc represents the third light-receiving element 85c; Sd represents the fourth light-receiving element 85d; and Si represents the information-detecting light-receiving element 85i.)

This allows the optical pickup apparatus according to the embodiment to achieve the same effects as those of the above-described optical pickup apparatus according to the third embodiment.

Figure 7:
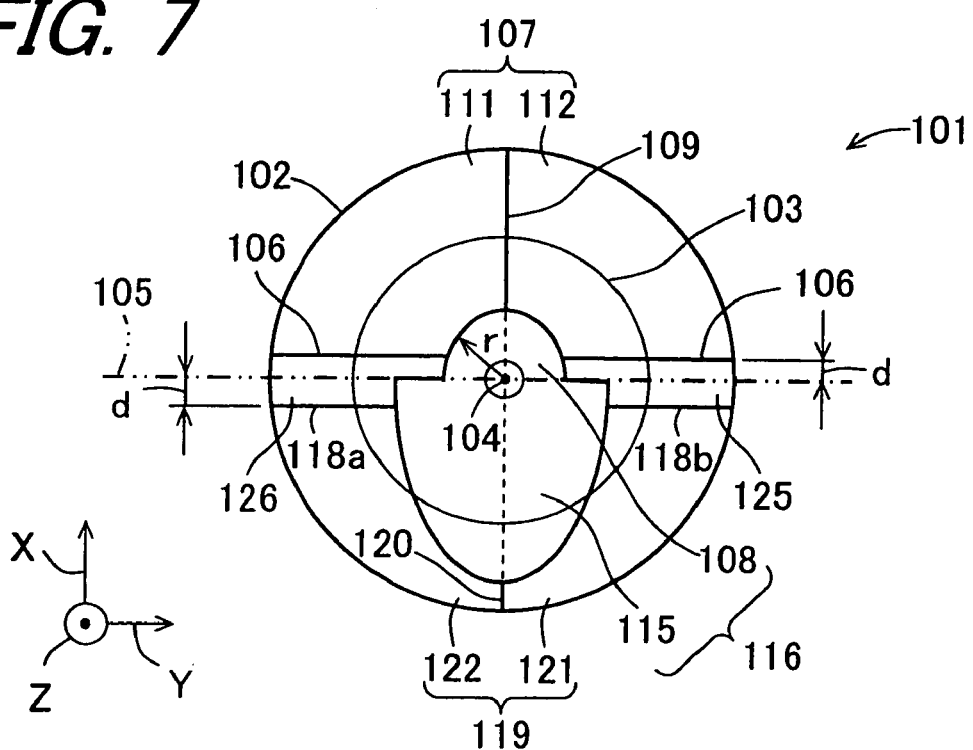
FIG. 7 is a view showing a configuration of a hologram element provided in an optical pickup apparatus according to a fifth embodiment of the invention.

FIG. 7 is a view showing a configuration of a hologram element 101 provided in an optical pickup apparatus according to a fifth embodiment of the invention. The optical pickup apparatus according to-the present invention is similar to the above-described optical pickup apparatus 40 according to the first embodiment. Accordingly, only different parts will be described, and the components corresponding to those in the first embodiment will be denoted by the same reference numerals so that common descriptions thereof will be omitted.

In the embodiment, the recording medium 47 is a DVD, for example, having a two-layer recording structure made of two 0.6 mm-thick disks bonded to each other. Among these two recording layers, a recording layer positioned close to the objective lens 45 is referred to as a first recording layer 47a while a recording layer positioned away from the objective lens 45 is referred to as a second recording layer 47b.

The optical pickup apparatus according to the embodiment comprises another hologram element 101 instead of the above-described hologram element 91 according to the fourth embodiment. The hologram element 101 according to the embodiment is disposed on the optical path between the light-detecting unit 46 and the objective lens 45. In the hologram element 101 are formed a plurality of divisions for splitting the light reflected by the recording medium 47 into a plurality of light beams. To be specific, the hologram element 101 comprises a tracking division for splitting light used for obtaining the track position information which indicates information of the light-condensed position of the emitted light onto the recording medium 47 with respect to a direction perpendicular to the optical axis 54 of the emitted light; and a focus division for splitting light used for obtaining the focus position information which indicates information of the light-condensed position of the emitted light onto the recording medium 47 with respect to a direction parallel to the optical axis 54 of the emitted light.

Hereinbelow, descriptions will be given to the divisions formed in the hologram element 101 with reference to FIG. 7. A hologram pattern 102 formed in the hologram element 101 so as to have the plurality of divisions has a circular outline when seen from one side in the Z-axis direction.

The hologram pattern 102 is firstly divided by a first dividing line 106 into a tracking division 107 and a remaining part. The first dividing line 106 is formed so as to be parallel to one virtual straight line 105 which passes through an optical axis 104 of reflected light 103 incident on the hologram element 101, reflected by the first recording layer (light-condensed recording layer) 47a in a state where the objective lens 45 is at a neutral position, and which is parallel on the hologram element 101 to the Y-axis direction that is a radial direction of the recording medium 47. At the same time, the first dividing line 106 is formed so as to be spaced away from the one virtual straight line 105 by a predetermined distance d toward one side in the X-axis direction.

The tracking division 107 is formed into a shape of substantial half of annulus ring when seen from one side in the Z-axis direction. The tracking division 107 is shaped by excluding from a substantial half circle a semicircular axis adjacent portion 108, a centrum of which is the optical axis 104, and a radius r of which is larger than the distance d and smaller than a radius of the total hologram pattern 102. The tracking division 107 is divided in half into a first division 111 and a second division 112 by a second dividing line 109 which is parallel to a direction orthogonal to the one virtual straight line 105 passing through the optical axis 104. That is to say, the second dividing line 109 is parallel to the X-axis direction. Consequently, each of the first division 111 and the second division 112 is formed into a substantial quarter of annulus ring.

The semicircular axis adjacent portion 108 is combined with a semielliptic portion 115 on the one virtual straight line 105 including the optical axis 104. The semielliptic portion 115 has a semielliptic shape, a short radius of which is positioned on the one virtual straight line 105 and a long radius of which is positioned on an extended line of the second dividing line 109 where the long radius is shorter than the radius of the hologram pattern 102. The semicircular axis adjacent portion 108 and the semielliptic portion 115 are thus combined with each other on the one virtual straight line 105 so as to form a third division 116 within the remaining part. The third division 116 is formed so as to constitute the focus division and to contain the optical axis 104 therein.

The remaining part of the hologram pattern 102 except the first to third divisions 111, 112, and 116 is divided by third dividing lines 118a and 118b into another tracking division 119 and a further remaining part. The third dividing lines 118a and 118b are formed so as to be parallel to the one virtual straight line 105 and so as to be spaced away from the one virtual straight line 105 toward the other side in the X-axis direction by a predetermined distance d. Another tracking division 119 is divided in half by a fourth dividing line 120 positioned on the extended line of the second dividing line 109, into a fourth division 121 and a fifth division 122. Consequently, in the hologram element 101 according to the embodiment, two tracking divisions; namely the tracking division 107 and another tracking division 119 are formed in both sides of the X-axis direction between which the one virtual straight line 105 lies.

In the hologram pattern 102, except for the first to fifth divisions 111, 112, 116, 121, and 122, there remain two divisions which extend in the Y-axis direction with the one virtual straight line 105 therebetween and which has a substantially-rectangular shape when seen from one side in the Z-axis direction. Among the above-mentioned two divisions having a substantially-rectangular shape, a division surrounded by the first division 111, third division 116, and fifth division 122 is referred to as a seventh division 126 while a division surrounded by the second division 112, third division 116, and fourth division 121 is referred to as a sixth division 125. Accordingly, regarding respective divisions constituting the circular hologram pattern 102, the first division 111, second division 112, sixth division 125, fourth division 121, fifth division 122, and seventh division 126 are disposed clockwise in this order while the third division 116 is disposed at a center portion.

In each of the first to seventh divisions 111, 112, 116, 121, 122, 125, and 126, a plurality of grooves are formed. Depths and spaces of these groves are set based on a diffraction efficiency of the hologram pattern 102 and a layout of the light-detecting unit 46.

Figure 8:
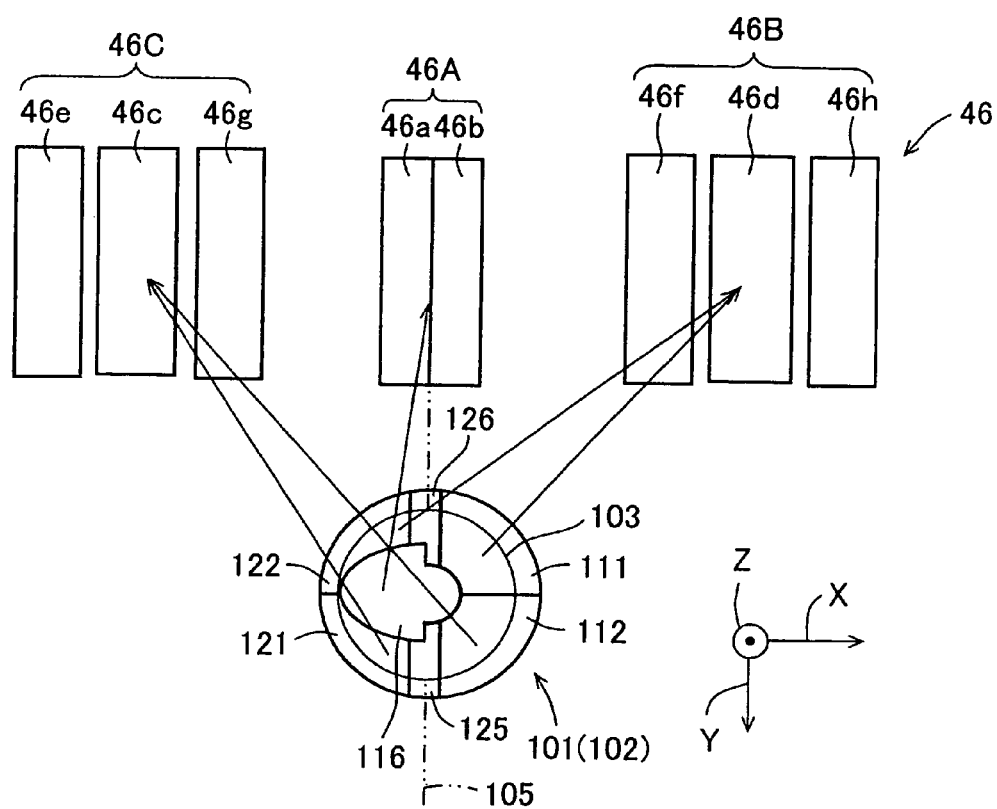
FIG. 8 is a view showing an outline of process that light split by a hologram pattern enters light-detecting unit.

FIG. 8 is a view showing an outline of process that light split by the hologram pattern 102 enters the light-detecting unit 46. The reflected light 103 which has been reflected by the first recording layer 47a serving as the light-condensed recording layer of the recording medium 47 and then entered the hologram element 101, is split in the first to seventh divisions 111, 112, 116, 121, 122, 125, and 126, and the light diffracted in the first to fifth divisions 111, 112, 116, 121, and 122 is guided to the light-detecting unit 46. The light-detecting unit 46 comprises a first light-receiving unit 46A including a first light-receiving element 46a and a second light-receiving element 46b; a second light-receiving unit 46B including a fourth light-receiving element 46d, a sixth light-receiving element 46f, and an eighth light-receiving element 46h; and a third light-receiving unit 46C including a third light-receiving element 46c, a fifth light-receiving element 46e, and a seventh light-receiving element 46g.

Light diffracted in the third division 116 serving as the focus division is received by the first and second light-receiving elements 46a and 46b of the first light-receiving unit 46A. Light diffracted in the first division 111 and fifth division 122 serving as the tracking divisions is received by the second light-receiving unit 46B. Light diffracted in the second division 112 and fourth division 121 serving as the tracking divisions is received by the third light-receiving unit 46C.

Light diffracted in the sixth division 125 and seventh division 126 fall on a position where the light is not received by the light-detecting unit 46, that is, a position where no light-receiving elements exist. As described above, the hologram element 101 according to the embodiment has the sixth and seventh divisions 125 and 126 which are formed on the one virtual straight line 105 and in which incident light is diffracted so as not to be directed either toward a light-receiving element for receiving light used for obtaining the track position information, or toward a light-receiving element for receiving light used for obtaining the focus position information.

The reflected light diffracted in the third division 116 is guided to the first light-receiving unit 46A for detecting FES which is then detected by both or one of the first and second light-receiving elements 46a and 46b. The FES indicating position information of the light-condensed position effected by the objective lens 45 with respect to a direction of optical axis is obtained by means of the knife edge method. In the knife edge method, a difference in light intensity between light received by the first light-receiving element 46a and light received by the second light-receiving element 46b is obtained and thereby, the FES can be obtained. To be specific, the FES can be obtained by the following formula (7):

$$FES = Ia - Ib \quad (7)$$

(wherein Ia represents light intensity detected by the first light-receiving element 46a; and Ib represents light intensity detected by the second light-receiving element 46b.)

With the layout of the hologram element 101 and the light-detecting unit 46 according to the embodiment, when the light emitted by the light source 41 is focused in front of the recording medium 47 (on a near side), the light reflected by the recording medium 47 is focused in front of the first light-receiving unit 46A, so that the light intensity Ib of the light received by the second light-receiving element 46b becomes larger than the light intensity Ia of the light received by the first light-receiving element 46a and as a result, an FES having a minus sign is obtained.

In contrast, in a case where a virtual focal point is made behind the objective lens 45 (on a far side), that is, on an opposite side of the objective lens 45 with respect to the recording medium 47, the light reflected by the recording medium 47 is focused at a position away from the first light-receiving unit 46A, so that the light intensity Ia of the light received by the first light-receiving element 46a becomes larger than the light intensity Ib of the light received by the second light-receiving element 46b and as a result, an FES having a plus sign is obtained.

Among the reflected light beams diffracted in the first division 111 and fifth division 122 of the hologram pattern 102, the reflected light of the main beam 51 is received by the fourth light-receiving element 46d of the second light-receiving unit 46B. The reflected light beams of the first sub beam 52 and second sub beam 53 are respectively received by the eighth and sixth light-receiving elements 46h and 46f of the second light-receiving unit 46B.

Among the reflected light beams diffracted in the second division 112 and fourth division 121 of the hologram pattern 102, the reflected light of the main beam 51 is received by the third light-receiving element 46c of the third light-receiving unit 46C. The reflected light beams of the first sub beam 52 and second sub beam 53 are respectively received by the seventh and fifth light-receiving elements 46g and 46e of the third light-receiving unit 46C.

The track position information is detected by means of the DPD method, for example, based on each result of light received by the second and third light-receiving units 46B and 46C. In the DPD method, the TES is obtained from a phase difference between light intensity Ic of the reflected light of main beam 51 received by the third light-receiving element 46c of the third light-receiving unit 46C and light intensity Id of the reflected light of main beam 51 received by the fourth light-receiving element 46d of the second light-receiving unit 46B. In other words, I(DPD) indicating the TES detected by means of the DPD method is obtained by the following formula (8):

$$I(DPD)=ph(Ic-Id) \quad (8)$$

(wherein ph represents the phase difference of the light intensity.)

The phase difference being generated changes depending on a position of the light beam through which the pit formed in the recording medium 47 passes. In a case where the pit passes through just a middle of the light beam, the phase difference becomes zero. Further, the TES indicating the track position information may be detected by means of the DPP method in stead of the above-described DPD method. In the DPP method, the TES is obtained from each result of light received by the second and third light-receiving units 46B and 46C.

The symbol I(DPP) indicating the TES detected by means of the DPP method is obtained by the following formula (9):

$$I(DPD)=(Ic-Id)-k\times((Ig-Ih)+(Ie-If)) \quad (8)$$

(wherein Ic represents the third light-receiving element 46c; Id represents the fourth light-receiving element 46d; Ie represents the fifth light-receiving element 46e; If represents the sixth light-receiving element 46f; Ig represents the seventh light-receiving element 46g; and Ih represents the eighth light-receiving element 46h.)

In the formula (9), the first term (Ic–Id) signifies a push pull signal of the main beam 51, and the second term (Ie–Ih) and (Ie–If) signifies push pull signals of the first and second sub beams 52 and 53 of ± first-order diffracted light, respectively. The three beams are brought to be positioned on the track of the recording medium 47 so that phases of (Ig–Ih) and (Ie–If) signifying the push pull signals of the first and second sub beams 52 and 53 are shifted from a phase of (Ic–Id) signifying the push pull signal of the main beam 51 by 180° to cancel offset appearing in the TES, generated by shift of the objective lens.

The coefficient k in the above-mentioned formula (9) is used for correction of difference in light intensity between the zero-order diffracted light; namely, the main beam 51, and the + first-order diffracted light; namely the first sub beam 52 and the – first-order diffracted light; namely the second sub beam 53. Assuming that the ratio of light intensity is specified as follows:

zero-order diffracted light: + first-order diffracted light: –first-order diffracted light=a:b:b, the coefficient k is obtained by a formula:

$$k=a/(2b).$$

The symbol I(RF) indicating the RF signal serving as an information-reproducing signal is obtained by the following formula (10):

$$I(RF)=Ic+Id+Ia+Ib \quad (10)$$

Figure 9:
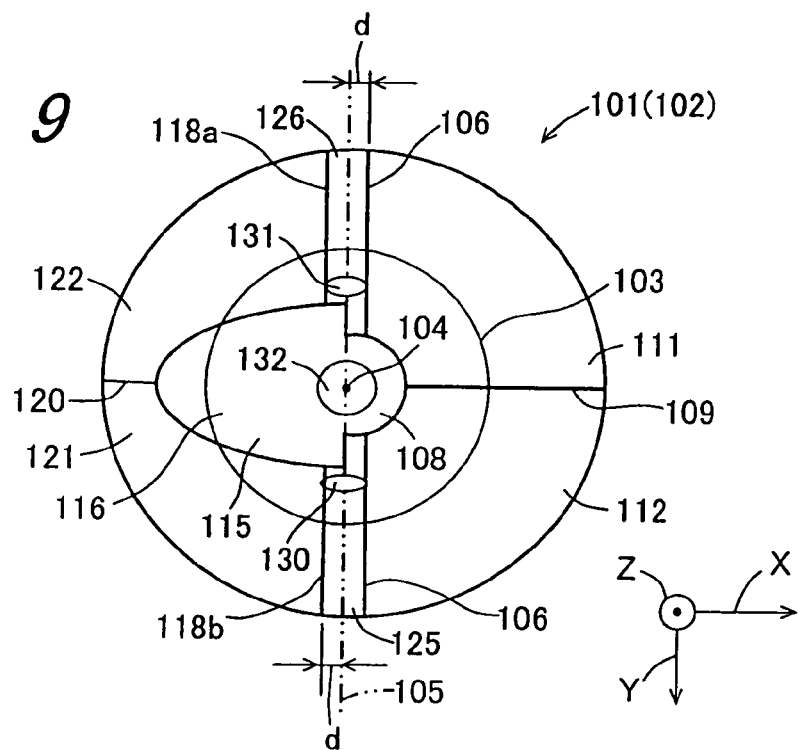
FIG. 9 is a view showing the hologram pattern where stray light is entering.

FIG. 9 is a view showing the hologram pattern 102 where stray light is entering. FIG. 9 shows a relation of a spaced distance d between the one virtual straight line 105 and the first dividing line 106 in the hologram pattern 102, and the stray light which is diffracted light diffracted by the second recording layer 47b, in a case of recording information onto the first recording layer 47a or reproducing information recorded on the first recording layer 47a.

In this case, the spaced distance d is set so as to contain therein ± first-order diffracted light spots 130 and 131 formed of the stray light reflected by the second recording layer 47b as much as possible when recording information onto the first recording layer 47a or reproducing information recorded on the first recording layer 47a. This is applied to the present embodiment and thus, 2d corresponding to a width in the X-axis direction of the sixth and seventh divisions 125 and 126 is set so that the ± first-order diffracted light spots 130 and 131 formed of the stray light reflected by the second recording layer 47b are contained as much as possible in the sixth and seventh divisions 125 and 126.

However, the larger spaced distance leads a decrease of the push pull components contained in the first and second divisions 111 and 112 serving as the tracking division 107 in the hologram pattern 102, so that characteristics of the TES are deteriorated. In order to deal with the problem, in the hologram element 101 according to the embodiment, fourth and fifth divisions 121 and 122 are formed as another tracking division 119 on the opposite side of the tracking division 107 across the one virtual straight line 105.

Light incident on the fourth and fifth divisions 121 and 122 is made to fall on the second and third light-receiving units 46B and 46C for detecting a signal related to the track position information, so as to be used together with light incident on the first and second divisions 111 and 112 to generate the TES. By so doing, the intensity of the TES, particularly, the light intensity of the sub beam is increased so that the TES characteristics can be enhanced.

Among the diffracted light beams acting as the stray light diffracted by the second recording layer 47b, light forming a zero-order diffracted light spot 132 enters, in an almost focused state, a vicinity of central portion of the hologram pattern 102, that is, around the optical axis 104 of the reflected light 103 reflected by the first recording layer 47a, which enters the hologram pattern 102 in a state where the objective lens 45 is at a neutral position. When the interlayer distance between the first recording layer 47a and the second recording layer 47b changes, a dimension in diameter of the zero-order diffracted light spot 132 also changes. A radius r of the semicircular axis adjacent portion 108 having as a center thereof the optical axis 104 and a long radius of the semielliptic portion 115 are formed so as to contain the spot even when the interlayer distance is different from a standard value by approximately ±15 μm.

The divisions are thus formed in the hologram pattern 102 and therefore, in a case of recording information onto the first recording layer 47a or reproducing information recorded on the first recording layer 47a, it is possible to reduce the stray light components entering the tracking division 107 and another tracking division 119 for generating the TES, so that a stable tracking servo control can be performed.

Further, the hologram element 101 may be formed so as to have different diffraction efficiencies in accordance with a polarization direction of light incident on the hologram element 101. Accordingly, for example, a one-quarter wavelength plate is disposed between the hologram element 101 and the recording medium 47, and a polarization direction of the light emitted by the light source 41 and a polarization direction of the light reflected by the recording medium 47 are turned around by 90 degrees, whereby the light emitted by the light source 41 can be almost transmitted by the hologram element 101 while only the light reflected by the recording medium 47 can be diffracted to generate the diffracted light. By giving the above-described polarization characteristics to the hologram element 101, light use efficiency is increased, so that rapid recording onto the recording medium 47 is made possible.

Figure 10:
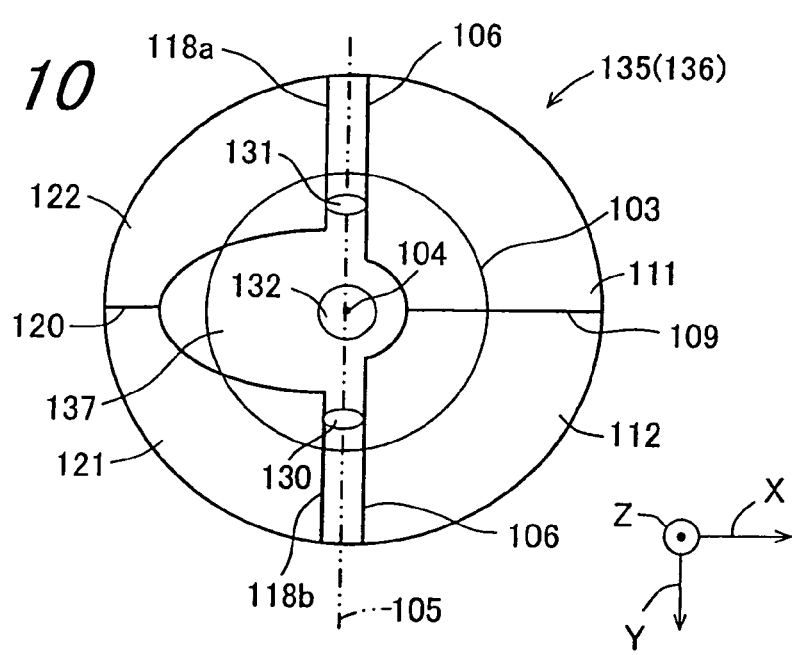
FIG. 10 is a view showing a configuration of a hologram element provided in an optical pickup apparatus according to a sixth embodiment of the invention.

FIG. 10 is a view showing a configuration of a hologram element 135 provided in an optical pickup apparatus according to a sixth embodiment of the invention. The optical pickup apparatus according to the present invention is similar to the above-described optical pickup apparatus according to the fifth embodiment. Accordingly, only different parts will be described, and the components corresponding to those in the fifth embodiment will be denoted by the same reference numerals so that common descriptions thereof will be omitted.

The optical pickup apparatus according to the embodiment comprises another hologram element 135 instead of the above-described hologram element 101 according to the fifth embodiment. The three divisions of the above-described hologram element 101 according to the fifth embodiment; namely, the third division 116, the sixth division 125, and the seventh division 126, are combined with each other to form one united third division 137 in a hologram pattern 136 of the hologram element 135 according to the embodiment.

In the united third division 137 which serves as the focus division, incident light thereon is diffracted toward the first light-receiving unit 46A receiving light for generating the FES. Even light incident on regions corresponding to the above-described sixth and seventh division 125 and 126 in the fifth embodiment can be diffracted in the united third division 137 so as to be directed toward the first light-receiving unit 46A on which the light falls. Accordingly, it is possible to increase an amount of light received by the first light-receiving unit 46A, that is to say, an amount of light which can be used for generating the RF and FES, with the result that an efficient utilization of light can be realized.

Further, all of the light beams forming the zero-order diffracted light spot 132 and the ± first-order diffracted light spots 130 and 131, which have been diffracted on the second recording layer 47b, enter the united third division 137 and then fall on the first light-receiving unit 46A. However, the light beams of the zero-order diffracted light spot 132 and ± first-order diffracted light spot 130 and 131 form extremely blurred fallen spots on the first light-receiving unit 46A, resulting in a spread-out of an intensity distribution of light incident as stray light and a sufficiently small amount of light with respect to the light reflected by the first recording layer 47a. Moreover, the FES is obtained by a differential between the light-receiving element 46a and the light-receiving element 46b and therefore, in a case where the light enters both of the light-receiving elements 46a and 46b, the light on the light-receiving element 46a and the light on the light-receiving element 46b are cancelled out, so that noise is hardly generated. There thus arise no particular problems.

Figure 11:
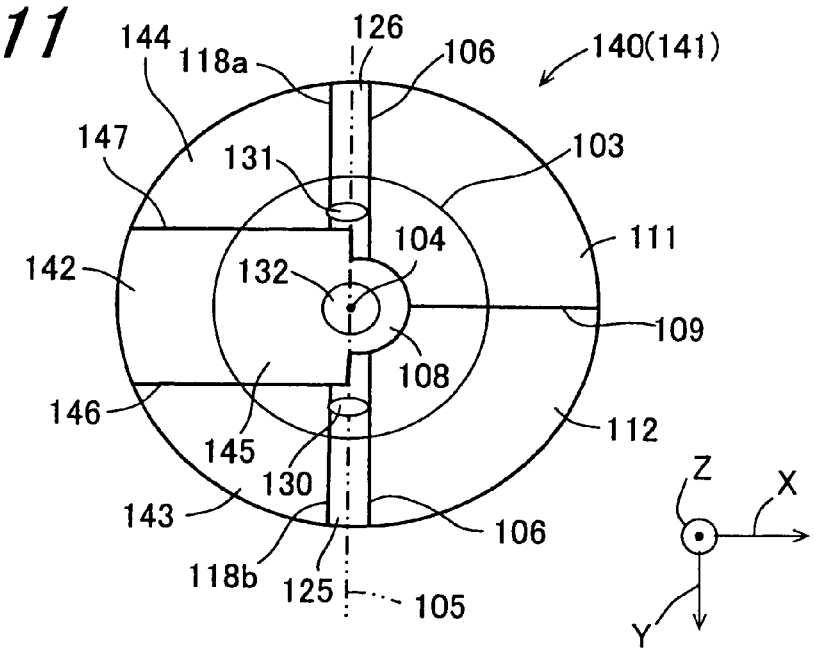
FIG. 11 is a view showing a configuration of a hologram element provided in an optical pickup apparatus according to a seventh embodiment of the invention.

FIG. 11 is a view showing a configuration of a hologram element 140 provided in an optical pickup apparatus according to a seventh embodiment of the invention. The optical pickup apparatus according to the present invention is similar to the above-described optical pickup apparatus according to the fifth embodiment. Accordingly, only different parts will be described, and the components corresponding to those in the fifth embodiment will be denoted by the same reference numerals so that common descriptions thereof will be omitted.

The optical pickup apparatus according to the embodiment comprises another hologram element 140 instead of the above-described hologram element 101 according to the fifth embodiment. A part of the hologram element 140 according to the embodiment, which is hereinafter referred to as "a combined portion" 145 and combined with the semicircular axis adjacent portion 108 to form a third division 142, is formed into a substantially-rectangular shape instead of the semielliptic shape. In other words, the combined portion 145 extends in parallel with the X-axis direction from the one virtual straight line 105 to a periphery of the hologram pattern 141 and moreover, is formed to be a substantially-rectangular region surrounded by fifth and sixth dividing lines 146 and 147 respectively forming boundaries with the fourth division 143 and fifth division 144; the one virtual straight line 105; and a periphery of the hologram pattern 136.

Accordingly, the fourth division 143 is formed to be a fan-shaped region surrounded by the third dividing line 118b, the fifth dividing line 146, and the periphery of the hologram pattern 141 while the fifth division 144 is formed to be a fan-shaped region surrounded by the third dividing line 118a, the sixth dividing line 147, and the periphery of the hologram pattern 114. In the optical pickup apparatus according to the embodiment provided with the hologram element 140 thus configured, concerning the removal of the stray light components traveling from the second recording layer 47b, it is possible to achieve the same effects as those of the above-described optical pickup apparatus according to the fifth embodiment.

Figure 12:
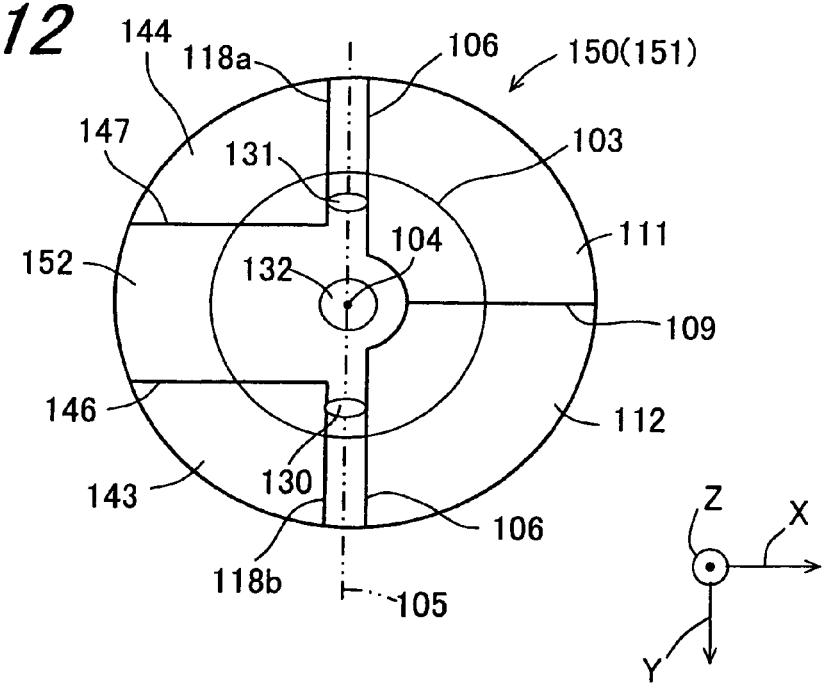
FIG. 12 is a view showing a configuration of a hologram element provided in an optical pickup apparatus according to an eighth embodiment of the invention.

FIG. 12 is a view showing a configuration of a hologram element 150 provided in an optical pickup apparatus according to an eighth embodiment of the invention. The optical pickup apparatus according to the present invention is similar to the above-described optical pickup apparatus according to the fifth embodiment. Accordingly, only different parts will be described, and the components corresponding to those in the fifth embodiment will be denoted by the same reference numerals so that common descriptions thereof will be omitted.

The optical pickup apparatus according to the embodiment comprises another hologram element 150 instead of the above-described hologram element 140 according to the seventh embodiment. The three divisions of the above-described hologram element 140 according to the seventh embodiment; namely, the third division 142, the sixth division 125, and the seventh division 126, are combined with each other to form one united third division 152 in a hologram pattern 151 of the hologram element 150 according to the embodiment.

In the optical pickup apparatus according to the embodiment provided with the hologram element 150 thus configured, it is possible to achieve the same effects as those of the above-described optical pickup apparatus according to the sixth embodiment.

Figure 13:
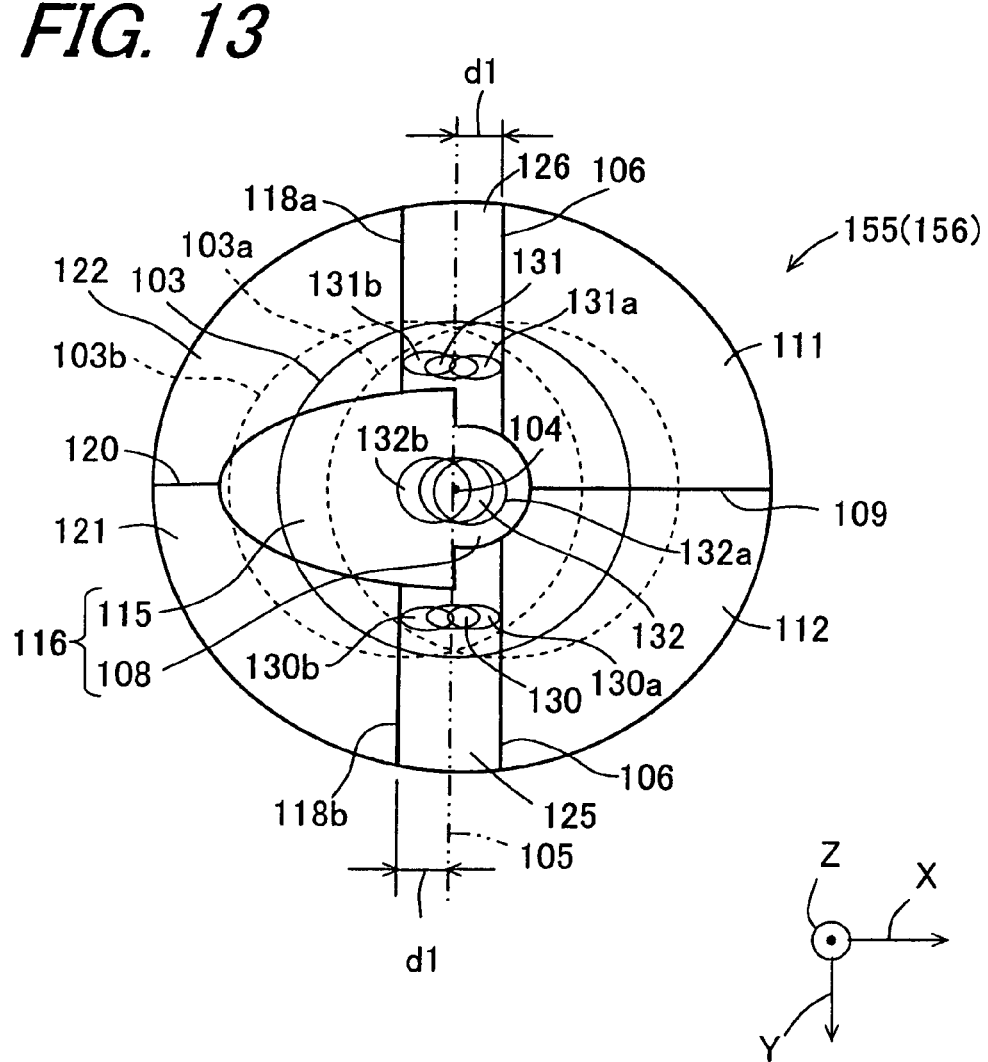
FIG. 13 is a view showing a configuration of a hologram element of an optical pickup apparatus according to a ninth embodiment of the invention.

FIG. 13 is a view showing a configuration of a hologram element 155 of an optical pickup apparatus according to a ninth embodiment of the invention. The optical pickup apparatus according to the present invention is similar to the above-described optical pickup apparatus according to the fifth embodiment. Accordingly, only different parts will be described, and the components corresponding to those in the fifth embodiment will be denoted by the same reference numerals so that common descriptions thereof will be omitted.

The optical pickup apparatus according to the embodiment comprises another hologram element 155 instead of the above-described hologram element 101 according to the fifth embodiment.

The hologram element 155 according to the embodiment is configured so that the ± first-order diffracted light of the main beam 51 and ± first-order diffracted light of the first and second sub beams 52 and 53 enter the sixth and seventh division 125 and 126 where incident light is diffracted so as not to be directed toward the second and third light-receiving units 46B and 46C receiving light used for obtaining the TES. The third dividing line 118a and first dividing line 106 forming the sixth division 125 are formed so as to be both in parallel with the Y-axis direction and both spaced away in the X-axis direction from the one virtual straight line 105 by the predetermined spaced distance d1. Further, the third dividing line 118b and first dividing line 106 forming the seventh division 126 are formed so as to be both in parallel with the Y-axis direction and both spaced away in the X-axis direction from the one virtual straight line 105 by the predetermined spaced distance d1.

That is to say, in the hologram-element 155 according to the embodiment, the spaced distance d1 between the one virtual straight line 105 and the first dividing line 106, which define dimensions in the X-axis direction of the sixth and seventh divisions 125 and 126 in a hologram pattern 156, is set to be larger than the above-described spaced distance d between the one virtual straight line 105 and the first dividing line 106 in the hologram element 101 according to the fifth embodiment. Longitudinal dimensions in the X-axis direction of the sixth and seventh divisions 125 and 126 are thus obtained by 2×d1 (the dimensions are hereinafter referred to as "2d1").

In other words, in the hologram element 155, the longitudinal dimensions 2d1 in the X-axis direction of the sixth and seventh divisions 125 and 126 are set so as to be able to encompass incident light spots formed of the stray components of all of the main beam 51 and the first and second sub beams 52 and 53 diffracted on the second recording layer 47b.

When the objective lens 45 is located at the neutral position, on the hologram pattern 156, among the light beams reflected by the first recording layer 47a, the main beam 51 is incident on such a position that a reflected-light spot 103 of the main beam 51 is located substantially in a middle of the hologram pattern 156 and an optical axis of the main beam 51 is located on the one virtual straight line 105, while the first and second sub beams 52 and 53 are incident on such positions that reflected-light spots 103a and 103b of the first and second sub beams 52 and 53 are partly overlapped with the reflected-light spot 103 of the main beam 51 and slightly shifted respectively on both sides in the X-axis directions of the reflected-light spot 103 of the main beam 51.

Regarding the zero-order diffracted light diffracted on the second recording layer 47b, the main beam 51 enters the axis adjacent portion 108 of the third division 116 where the main beam 51 then forms a zero-order diffracted light spot 132, while the first and second sub beams 52 and 53 are incident on such positions that zero-order diffracted light spots 132a and 132b of the first and second sub beams 52 and 53 are partly overlapped with the zero-order diffracted light spot 132 of the main beam 51 and slightly shifted respectively on both sides in the X-axis directions of the zero-order diffracted light spot 132 of the main beam 51. A dimension of the third division 116 is set so that the third division 116 can encompass all of the zero-order diffracted light spot 132 of the main beam 51 and the zero-order diffracted light spot 132a and 132b of the first and second sub beams 52 and 53.

Regarding the ± first-order diffracted light diffracted on the second recording layer 47b, in the sixth division 125, the main beam 51 is incident on the one virtual straight line 105 around which the + first-order diffracted light spot 130 of the main beam 51 is formed, while the first and second sub beams 52 and 53 are incident on such positions that the + first-order diffracted light spots 130a and 130b of the first and second sub beams 52 and 53 are slightly shifted respectively on both sides in the X-axis directions of the + first-order diffracted light spot 130 of the main beam 51. In the seventh division 126, the main beam 51 is incident on the one virtual straight line 105 around which a − first-order diffracted light spot 131 of the main beam 51 is formed, while the first and second sub beams 52 and 53 are incident on such positions that − first-order diffracted light spots 131a and 131b of the first and second sub beams 52 and 53 are slightly shifted respectively on both sides in the X-axis directions of the − first-order diffracted light spot 131 of the main beam 51.

The longitudinal dimensions 2d1 in the X-axis direction of the sixth and seventh division 125 and 126 are set so that the sixth and seventh division 125 and 126 can respectively encompass all of the + first-order diffracted light spot 130 of the main beam 51, the + first-order diffracted light spots 130a and 130b of the first and second sub beams 52 and 52, the − first-order diffracted light spot 131 of the main beam 51, and the − first-order diffracted light spots 131a and 131b of the first and second sub beams 52 and 53.

As described above, in the hologram element 155, the ± first-order diffracted light beams of the main beam 51 and first and second sub beams 52 and 53 diffracted by the second recording layer 47b are made to enter the sixth and seventh divisions 125 and 126 where incident light is diffracted so as not to be directed toward any of the first and third light-receiving units 46B and 46C for receiving light used for obtaining the track position information and the first light-receiving unit 46A for receiving light used for obtaining the focus position information.

Accordingly, the so-called stray light attributable to the light reflected by the second recording layer 47b can be made not to fall on either of the TES-generating light-receiving element and the FES-generating light-receiving element. This makes it possible to prevent the TES and FES from containing the stray light noise so that the TES and FES can be stably generated.

Figure 14:
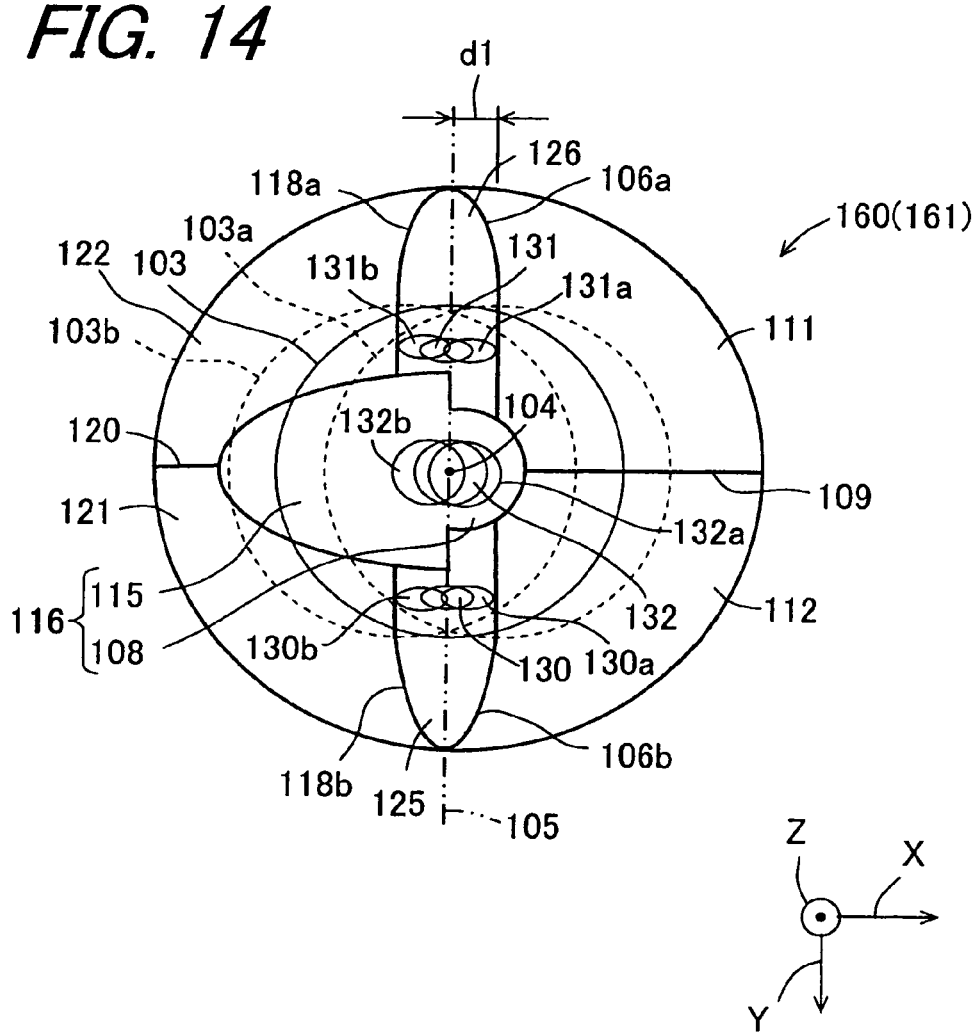
FIG. 14 is a view showing a configuration of a hologram element provided in an optical pickup apparatus according to a tenth embodiment of the invention.
Figure 15:
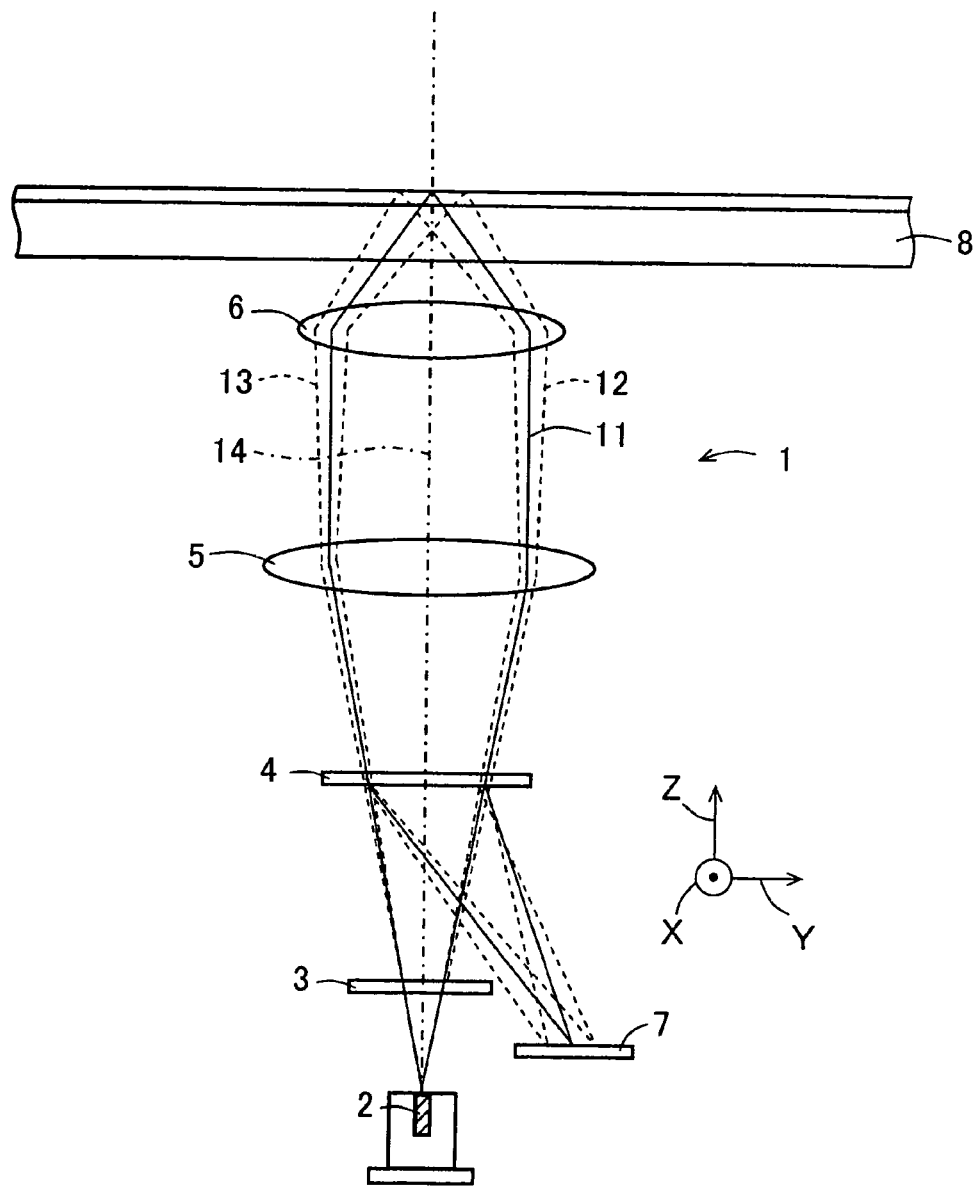
FIG. 15 is a schematic view showing a configuration of a related-art optical pickup apparatus.
Figure 16:
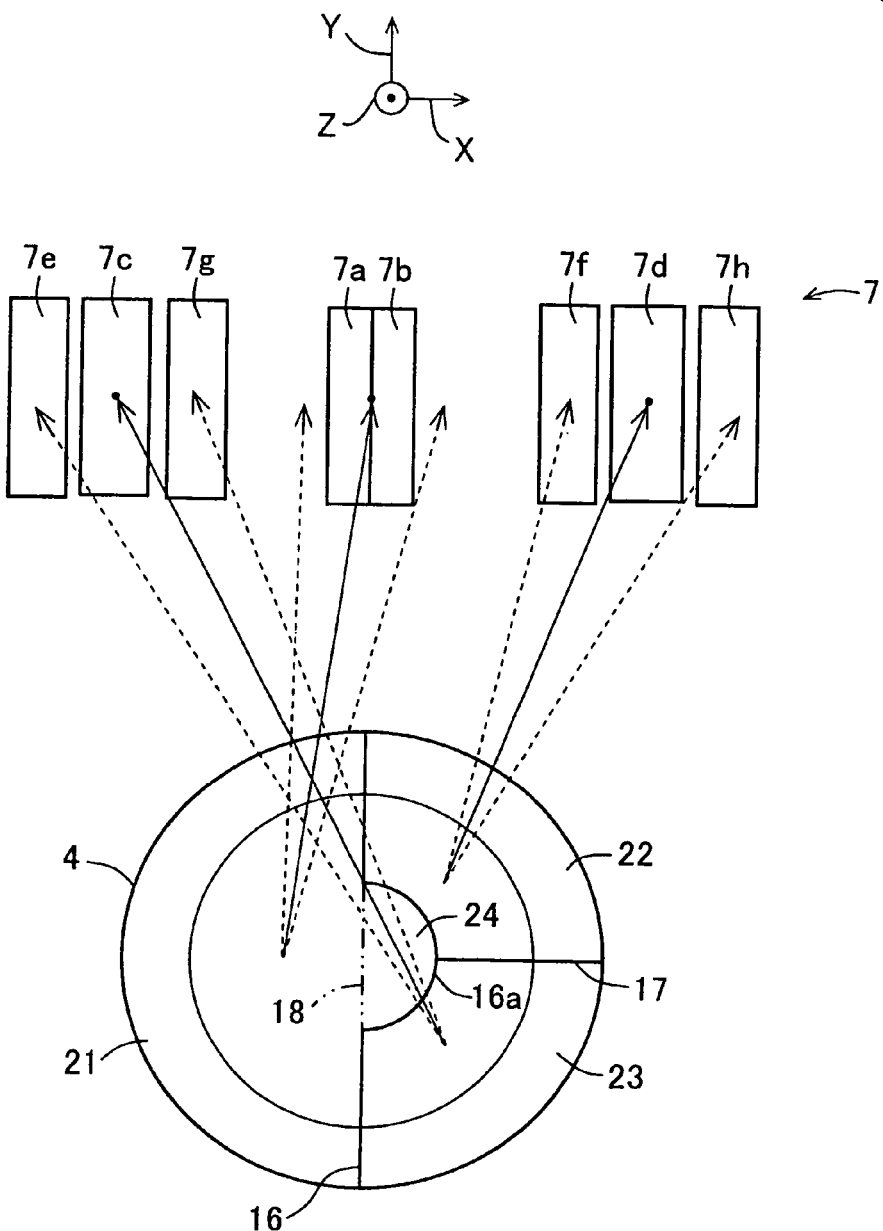
FIG. 16 is a schematic view showing configurations of a hologram element and light-detecting unit provided in the optical pickup apparatus shown in FIG. 15.
Figure 17:
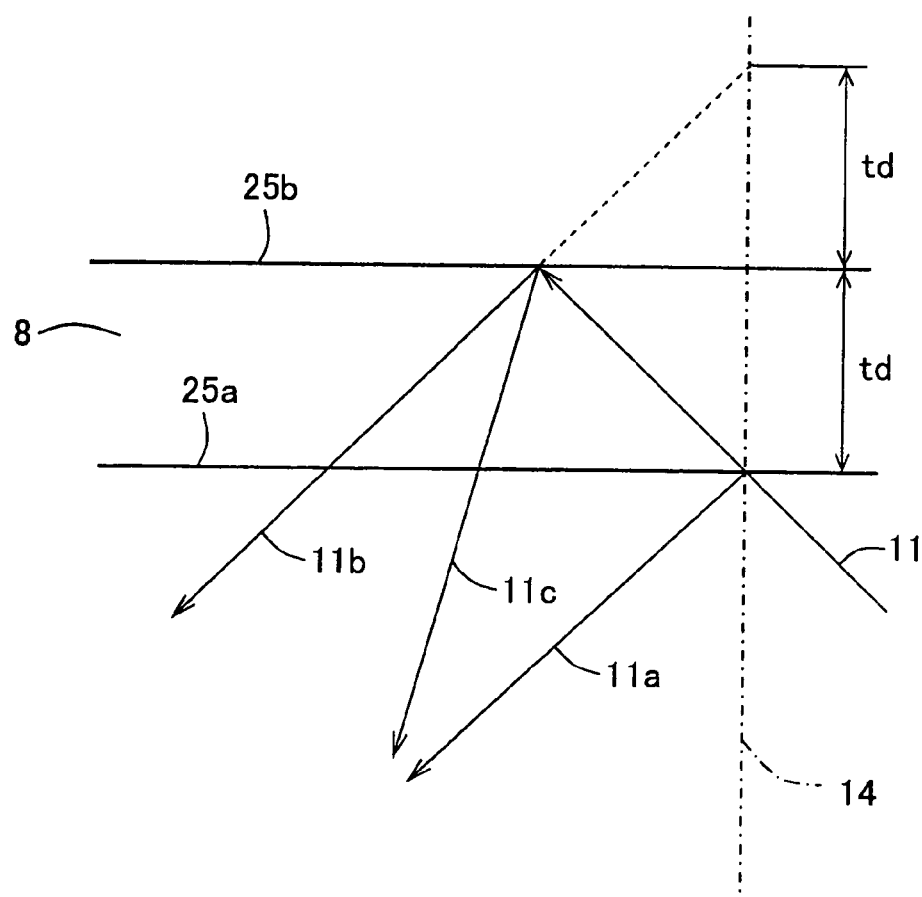
FIG. 17 is a view of assistance in explaining outlines of processes related to transmission and reflection of light on a recording medium having two recording layers.
Figure 18:
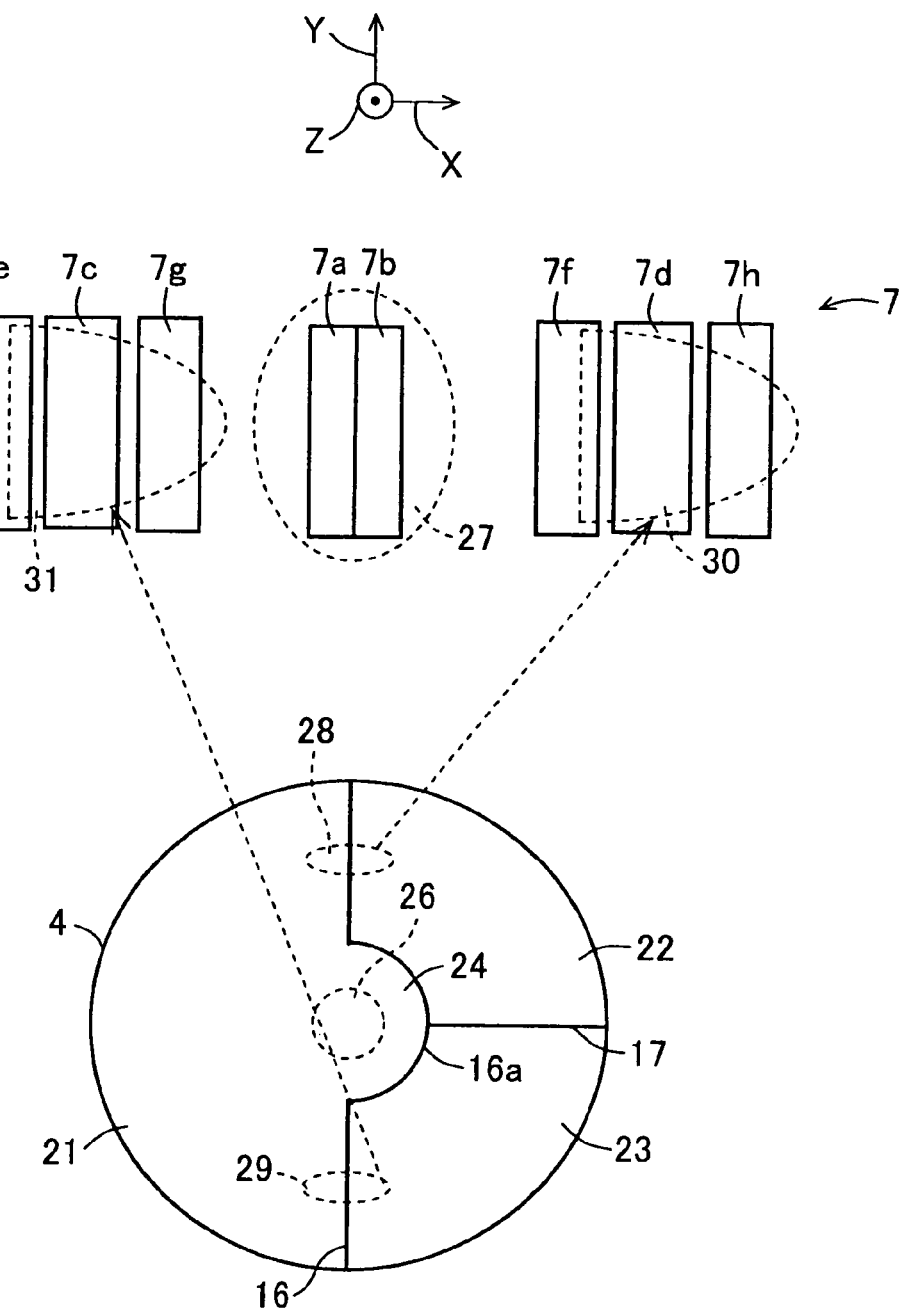
FIG. 18 is a view of assistance in explaining a state where light diffracted by a second recording layer enters a hologram element and light-detecting unit.

FIG. 14 is a view showing a configuration of a hologram element 160 provided in an optical pickup apparatus according to a tenth embodiment of the invention. The optical pickup apparatus according to the present invention is similar to the above-described optical pickup apparatus according to the ninth embodiment. Accordingly, only different parts will be described, and the components corresponding to those in the ninth embodiment will be denoted by the same reference numerals so that common descriptions thereof will be omitted.

The optical pickup apparatus according to the embodiment comprises another hologram element 160 instead of the above-described hologram element 155 according to the ninth embodiment.

In the above description of the hologram element 155 according to the ninth embodiment, all of the third dividing lines 118a and 118b and first dividing line 106 forming the sixth and seventh divisions 125 and 126 are parallel to the Y-axis direction. In the hologram element 160 according to the present embodiment, the third dividing lines 118a and 118b and first dividing line 106 need not be always parallel to the Y-axis direction.

On a hologram pattern 161 of in the hologram element 160 according to the embodiment, the third dividing line 118a and the first dividing line 106a are inclined so as to come closer to each other as these lines are directed to one side in the Y-axis direction, in other words, along one way in the Y-axis direction which is directed away from the reflected-light spot 103 of the main beam 51. When the third dividing line 118a and the first dividing line 106a are defined as described above, the first division 111, the third division 116, and the fifth division 122 surround a region which is thus formed into a tapered shape toward the one side in the Y-axis direction. The region is the seventh division 126.

On the hologram pattern 161 of in the hologram element 160 according to the embodiment, the third dividing line 118*b* and the first dividing line 106*b* are inclined so as to come closer to each other as these lines are directed to the other side in the Y-axis direction, in other words, along one way in the Y-axis direction which is directed away from the reflected-light spot 103 of the main beam 51. When the third dividing line 118*b* and the first dividing line 106*b* are defined as described above, the second division 112, the third division 116, and the fourth division 121 surround a region which is thus formed into a tapered shape toward the other side in the Y-axis direction. The region is the sixth division 125.

In the optical pickup apparatus according to the embodiment provided with the hologram element 160 thus configured, it is possible to achieve the same effects as those of the above-described optical pickup apparatus according to the ninth embodiment provided with the hologram element 155.

Each of the above-described embodiments is merely illustrative and a configuration thereof can be modified within a scope of the invention. For example, in each of the above-described embodiment, the description is given to the optical pickup apparatus used in a case where the recording medium 47 has two recording layers. However, even in a case where the recording medium 47 has three or more recording layers, it is possible to obtain the same effects as those obtained in each of the above-described embodiments.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An optical pickup apparatus for recording information onto a recording medium having a plurality of recording layers for recording information and/or reproducing information on the recording medium by irradiating the recording medium with light the recording medium, the optical pickup apparatus comprising:
   a light source for emitting light;
   a light-condensing unit for condensing light emitted by the light source onto one recording layer of the recording medium, the light-condensing unit changing a light-condensed position of the emitted light with respect to the recording medium by displacement of the emitted light in a direction perpendicular to an optical axis of the emitted light;
   a light-detecting unit having a plurality of light-receiving elements for receiving light reflected by the recording medium; and
   a light-splitting unit provided between the light-detecting unit and the light-condensing unit, the light-splitting unit having a plurality of divisions for diffracting the light reflected by the recording medium toward the plurality of light-receiving elements,
   the light-splitting unit comprising a division for diffracting at least first-order diffracted light among diffracted light beams obtained by reflection and diffraction on recording layers other than the one recording layer on which light is condensed by the light-condensing unit so as not to be directed either toward a light-receiving element for detecting track position information indicating information of emitted light condensing position to the recording medium in the direction perpendicular to the optical axis of the emitted light or toward a light-receiving element for receiving light used for obtaining the focus position information and another division for diffracting at least first-order diffracted light among diffracted light beams obtained by reflection and diffraction on recording layers other than the one recording layer on which light is condensed by the light-condensing unit so as to be directed toward said light-receiving element for receiving light used for obtaining the focus position information.

2. The optical pickup apparatus of claim 1, wherein the light-splitting unit further has a division where zero-order diffracted light among the diffracted light beams which are obtained by reflection and diffraction on recording layers other than the one recording layer is diffracted so as not to be directed toward the light-receiving element for detecting the track position information.

3. The optical pickup apparatus of claim 1, wherein the light-splitting unit further has a division being capable of encompassing a light spot independently of its position which light spot is formed as a result of incidence of zero-order diffracted light among the diffracted light beams obtained by reflection and diffraction on recording layers other than the recording layer on which light is condensed by the light-condensing unit, and whose position fluctuates in the direction perpendicular to the optical axis of the emitted light in accordance with displacement of the light-condensing unit in the direction perpendicular to the optical axis of the emitted light.

4. The optical pickup apparatus of claim 1, wherein the light-splitting unit further has a division where at least first-order diffracted light among the diffracted light beams which are obtained by reflection and diffraction on recording layers other than the recording layer on which light is condensed by the light-condensing unit enters.

5. The optical pickup apparatus of claim 1, wherein the light-splitting unit is formed so that a division where the zero-order diffracted light among the diffracted light beams enters is different from a division where higher-order diffracted light there among enters.

6. The optical pickup apparatus of claim 5, wherein the division of the light-splitting unit where the higher-order diffracted light enters, is adapted not to diffract but to transmit the higher-order diffracted light.

7. The optical pickup apparatus of claim 5, wherein the division of the light-splitting unit where the higher-order diffracted light enters, is adapted to diffract the higher-order diffracted light toward a. position where at least no tracking error signal-generating light-receiving elements exist.

8. The optical pickup apparatus of claim 5, wherein the light-detecting unit further comprises an information-detecting light-receiving element other than a light-receiving element for detecting focus position information indicating information of the light condensing position of the emitted light in a direction parallel to an optical axis of the emitted light with respect to the recording medium, and the light-receiving element for detecting the track position information, wherein the light-splitting unit is adapted to diffract higher-order diffracted light among the diffracted light beams toward the information-detecting light-receiving element which diffracted light beams are obtained by reflection and diffraction on recording layers other than the recording layer on which light is condensed by the light-condensing unit.

9. The optical pickup apparatus of claim 1, wherein the light-splitting unit is formed so that a division where the zero-order diffracted light among the diffracted light beams enters is a same as a division where higher-order diffracted light among the diffracted light beams enters.

10. The optical pickup apparatus of claim 1, further comprising a diffraction element for splitting the light emitted by the light source into at least a main beam and two sub beams, wherein the light-splitting unit has a division where the zero-order diffracted light and higher-order diffracted light of the main beam and sub beams are diffracted so as not to be directed toward the light-receiving element for detecting the track position information, the zero-order diffracted light and higher-order diffracted light being obtained by reflection and diffraction on recording layers other than the recording layer on which light is condensed by the light-condensing unit.

11. The optical pickup apparatus of claim 1, further comprising a diffraction element for splitting the light emitted by the light source into at least a main beam and two sub beams, wherein the light-splitting unit has a division where the zero-order diffracted light of the main beam and sub beams and the higher-order diffracted light of the main beam which are obtained by reflection and diffraction on recording layers other than the recording layer on which light is condensed by the light-condensing unit are diffracted so as not to be directed toward the light-receiving element for detecting the track position information.

12. The optical pickup apparatus of claim 1, wherein the light-condensing unit is provided so as to be displaceable within a movable range including a neutral position where an optic axis of the light-condensing unit is coaxial with the optical axis of the light emitted by the light source, in a direction perpendicular to the optical axis of the emitted light, and wherein the light-splitting unit has tracking divisions for splitting light used for obtaining the track position information, and a focus division for splitting light used for obtaining focus position information indicating information of the light-condensed position of the emitted light in a direction parallel to the optical axis of the emitted light with respect to the recording medium, and wherein the tracking divisions are formed on both sides of a division where the first-order diffracted light is diffracted so as not to be directed toward the light-receiving element for detecting the track position information.

13. The optical pickup apparatus of claim 12, wherein the tracking divisions are formed on both sides of a division for diffracting the first-order diffracted light so as not to be directed toward the light-receiving element for detecting the track position information, the tracking divisions being on both sides of one virtual straight line which passes through an optical axis of reflected light entering the light-splitting unit in a state where the light-condensing unit is at the neutral position and which is parallel on the light-splitting unit to a radial direction of the recording medium.

14. The optical pickup apparatus of claim 13, wherein the light-splitting unit further has a division formed on one virtual straight line, the division being adapted not to diffract incident light toward either of a light-receiving element for receiving light used for obtaining the track position information and a light-receiving element for receiving light used for obtaining the focus position information.

15. The optical pickup apparatus of claim 13, wherein the light-splitting unit further has a division formed on one virtual straight line, the division being adapted to diffract incident light toward a light-receiving element for receiving light used for obtaining the focus position information.

16. The optical pickup apparatus of claim 13, further comprising a diffraction element for splitting the light emitted by the light source into at least a main beam and two sub beams, wherein the light-splitting unit guides the higher-order diffracted light of the main beam which are obtained by reflection and diffraction on a recording layer other than the recording layer on which light is condensed by the light-condensing unit, to enter a division formed on the one virtual straight line of the light-splitting unit, the division being adapted not to diffract incident light toward either of a light-receiving element for receiving light used for obtaining the track position information and a light-receiving element for receiving light used for obtaining the focus position information.

17. The optical pickup apparatus of claim 13, further comprising a diffraction element for splitting the light emitted by the light source into at least a main beam and two sub beams, wherein the light-splitting unit guides higher-order diffracted light of the main beam and sub beams which are obtained by reflection and diffraction on a recording layer other than a recording layer on which light is condensed by the light-condensing unit, to enter a division formed on the one virtual straight line of the light-splitting unit, the division being adapted not to diffract incident light toward either of a light-receiving element for receiving light used for obtaining the track position information and a light-receiving element for receiving light used for obtaining the focus position information.

18. The optical pickup apparatus of claim 12, wherein the focus division is formed so as to include an optical axis of reflected light entering the light-splitting unit in a state where the light-condensing unit is at the neutral position.

19. The optical pickup apparatus of claim 1, wherein the light-splitting unit has different diffraction efficiencies in accordance with a polarization direction of light incident on the light-splitting unit.

* * * * *